(12) United States Patent
Yamano et al.

(10) Patent No.: US 8,508,902 B2
(45) Date of Patent: Aug. 13, 2013

(54) ELECTRIC CIRCUIT

(75) Inventors: Hitoshi Yamano, Osaka (JP); Sumiaki Hinamoto, Osaka (JP)

(73) Assignee: Idec Corporation, Osaka-shi, Osaka (JP)

( * ) Notice: Subject to any disclaimer, the term of this patent is extended or adjusted under 35 U.S.C. 154(b) by 352 days.

(21) Appl. No.: 12/865,529

(22) PCT Filed: Jan. 28, 2009

(86) PCT No.: PCT/JP2009/051330
§ 371 (c)(1),
(2), (4) Date: Jul. 30, 2010

(87) PCT Pub. No.: WO2009/096414
PCT Pub. Date: Aug. 6, 2009

(65) Prior Publication Data
US 2011/0002069 A1    Jan. 6, 2011

(30) Foreign Application Priority Data
Jan. 31, 2008  (JP) .................................. 2008-021978

(51) Int. Cl.
*H02H 9/08* (2006.01)
(52) U.S. Cl.
USPC ........................................................ 361/93.9
(58) Field of Classification Search
USPC .................................... 361/58, 93.9, 88, 93.1
See application file for complete search history.

(56) References Cited

U.S. PATENT DOCUMENTS
5,374,887 A * 12/1994 Drobnik ......................... 323/299

FOREIGN PATENT DOCUMENTS
| JP | 2004-119078 A | 4/2004 |
| JP | 2005-045957 A | 2/2005 |
| JP | 2006-085327 A | 3/2006 |
| JP | 2006-301804 A | 11/2006 |
| JP | 2007-324843 A | 12/2007 |

OTHER PUBLICATIONS

International Search Report of PCT/JP2009/051330, Mailing Date of Apr. 28, 2009.
Japanese Office Action dated Dec. 12, 2012, issued in corresponding Japanese Patent Application No. 2008-021978, (4 pages). With English Translation.

* cited by examiner

*Primary Examiner* — Rexford Barnie
*Assistant Examiner* — Christopher Clark
(74) *Attorney, Agent, or Firm* — Westerman, Hattori, Daniels & Adrian, LLP

(57) ABSTRACT

A functional element is prevented from breakdown and deterioration because of mounting and demounting of the functional element immediately after cut-off of driving power from a constant-current power supply or during supply of the driving power.
An electric circuit is configured to electrically connect a constant-current power supply 1 having a capacitance between an output terminal and a reference potential terminal and a detachable functional element 2 to each other. The electric circuit has an element breakdown prevention circuit 10 having a first circuit terminal connected to an output terminal of the constant-current power supply 1 through the functional element 2, and a second circuit terminal connected to the reference potential terminal of the constant-current power supply 1 through the functional element 2. The element breakdown prevention circuit 10 increases an impedance between the circuit terminals to a disconnected state impedance in response to a transition from a connected state, in which the functional element 2 is mounted, to a disconnected state, in which the functional element 2 is removed. The element breakdown prevention circuit 10 decreases the impedance between the circuit terminals to a connected-state impedance in response to a connection state transition.

9 Claims, 12 Drawing Sheets

FIG. 4
(A)
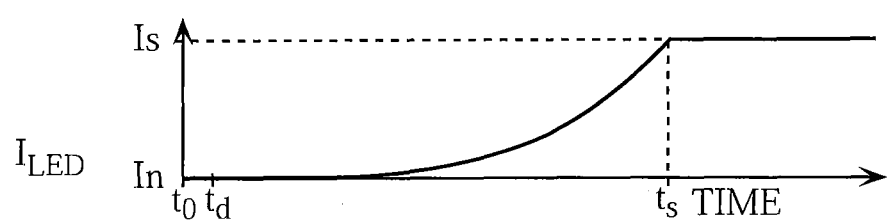
(B)
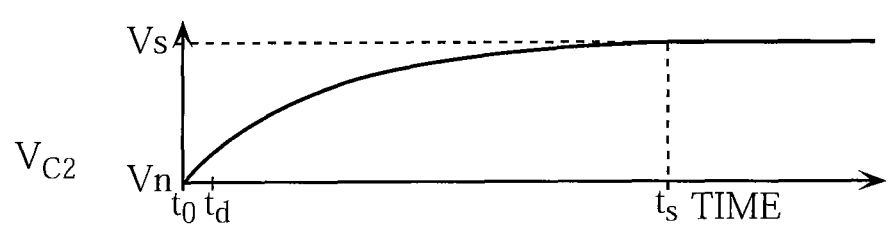
(C)
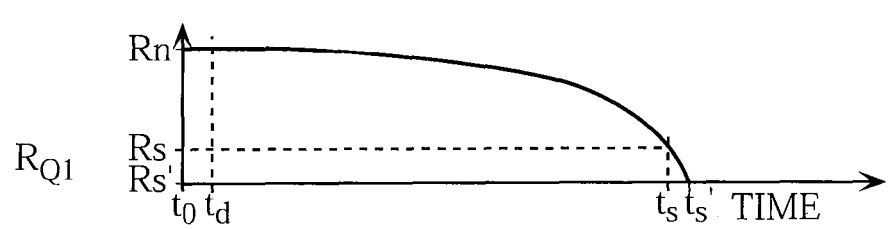

FIG. 9
(A) 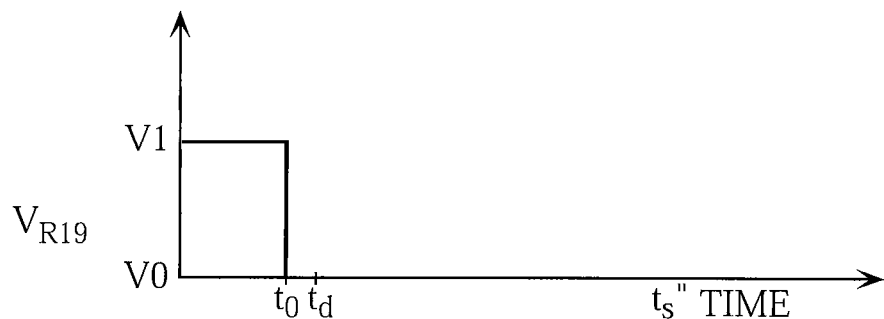
(B) 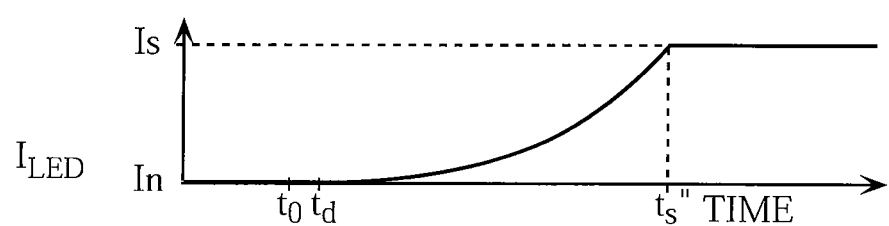
(C) 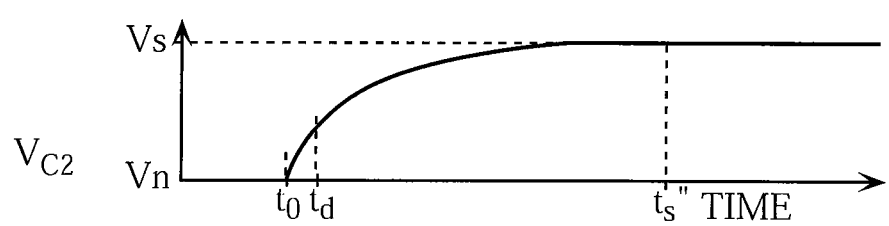
(D) 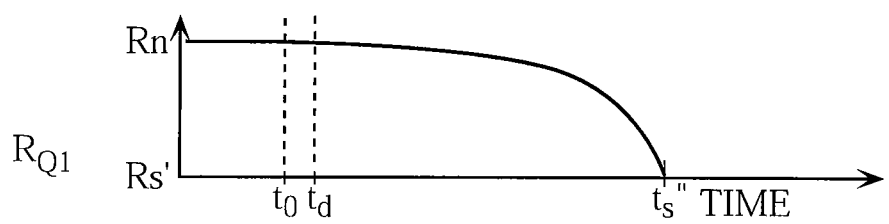

FIG. 11
(A)
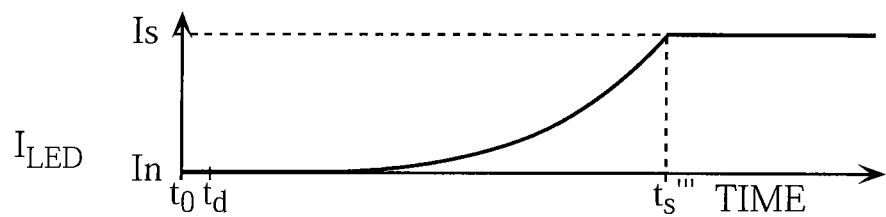
(B)
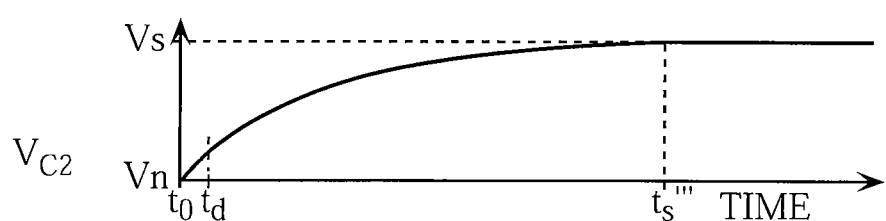
(C)
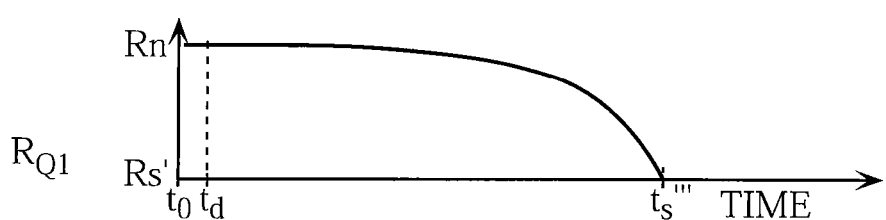

FIG. 12
PRIOR ART
(A)
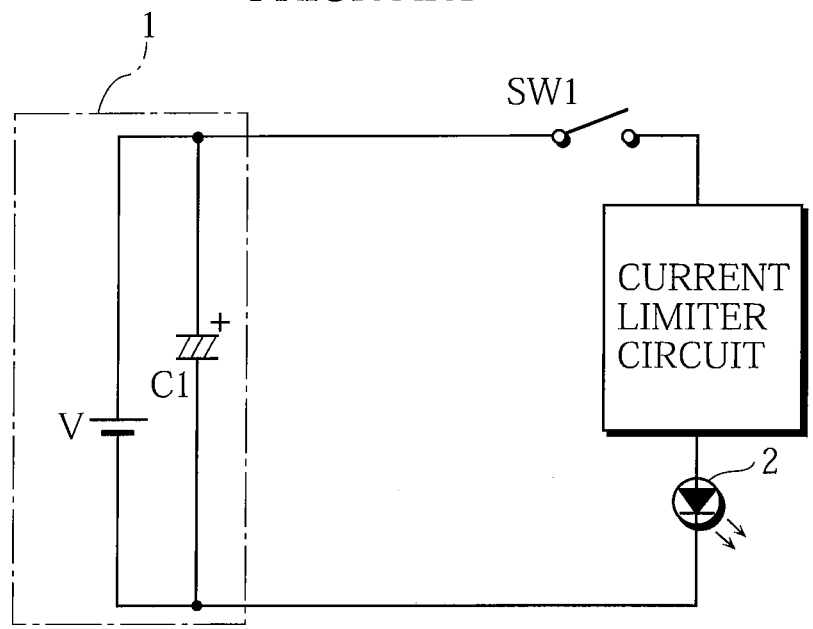
(B)
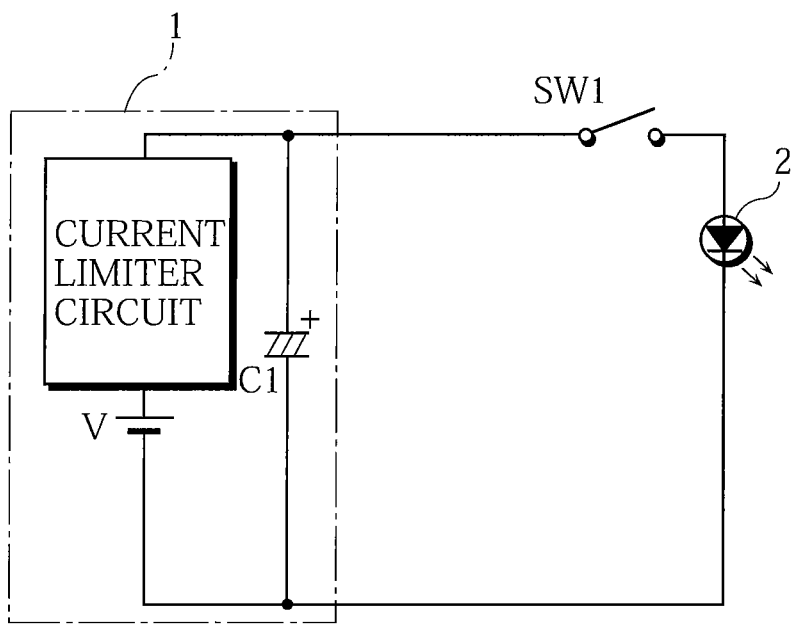

ELECTRIC CIRCUIT

TECHNICAL FIELD

The present invention relates to an electric circuit for connecting to each other a constant-current power supply and a detachable functional element driven by electric power from the constant-current power supply, and more particularly to an electric circuit that prevents the functional element from breakdown due to mounting and demounting of the functional element.

BACKGROUND ART

A typical conventional light-emitting apparatus turns on an LED as in the following manners. A resistor and an LED are connected in series to a constant-voltage power supply so that the resistor can adjust the current passing through the LED. Alternatively, as illustrated in FIG. 12(A), a current limiter circuit is connected between a constant-voltage power supply 1 and an LED 2 in series so that the current limiter circuit can adjust the current passing through the LED. However, when a resistor or a current limiter circuit is connected in series, the inserted resistor or current limiter circuit serves as a load during normal operation of the LED, causing energy loss.

In recent years, LEDs have had increasingly high brightness, and unlike conventional LEDs for indication purposes, it has been necessary to operate the LEDs at high current. In the case where the LEDs are driven at high current, energy loss resulting from the load because of the inserted resistor or the inserted current limiter circuit will increases if the apparatus has the same configuration as the typical conventional light-emitting apparatus. In order to reduce such energy loss and also to accelerate device size reduction, it has become more common to use a constant-current power supply in place of a constant-voltage power supply.

Conventional common power supplies have a capacitor between the reference potential terminal and the output terminal in order to supply stable voltage and current and to reduce fluctuation due to noise or the like (see, for example, Patent Document 1). In this capacitor, electric charge according to the capacity of the capacitor and the output voltage of the constant-current power supply is stored during the operation of the constant-current power supply. Even after the operation is stopped, electric charge is kept stored until electric charge is completely released by self-discharge.

In a typical conventional light-emitting apparatus that lights an LED 2 by electric power from a common constant-current power supply 1, the constant-current power supply 1 and the LED 2 are connected to each other by wiring, as illustrated in FIG. 12(B). In such a case, when the LED 2 is mounted while electric charge is being stored in a capacitor C1, the LED 2 may break or deteriorate. The reason is that, although only a current with a predetermined current value is supplied from the current limiter circuit, electric charge stored in the capacitor C1 is discharged instantly when the LED 2 is mounted, and therefore a very high current (instantaneous current) passes therethrough instantaneously.

[Patent Document 1] JP 2004-119078 A

DISCLOSURE OF THE INVENTION

Problems to be Solved by the Invention

In order to prevent the breakdown or deterioration of the LED, mounting of the LED should be carried out a predetermined time later after stopping the operation of the constant-current power supply. However, in the case of an LED driven at high current, the amount of electric charge stored in the capacitor C1 is very large, so it has not been a realistic solution to wait for the completion of self-discharge. In addition, in a light-emitting apparatus for reporting emergency such as an emergency light, the emergency light cannot be turned off for ensuring safety as long as a device that is monitored by the emergency light or the like is being operated. Therefore, it is necessary to avoid stopping such a device for the purpose of replacing all or part of the LEDs in the emergency light. Accordingly, there has been a strong demand for an apparatus in which LEDs can be replaced while the constant-current power supply is kept operated. In addition, in the case that a large number of LEDs with a plurality of colors are provided to form graphics, patterns, and images, there has been a strong demand for an apparatus in which LEDs can be replaced while the constant-current power supply is being operated so that the colors and locations can be visually confirmed while replacing the LEDs.

Although the foregoing has described the case that a capacitor is connected between the output terminal and the reference potential terminal, the same applies to any of the constant-current power supply having a capacitance between the output terminal and the reference potential terminal. Also, although the foregoing had described the case of light-emitting apparatus, the same applies to any common electric apparatus having a detachable functional element driven by a constant-current power supply.

Accordingly, the electric circuit according to the present invention prevents breakdown or deterioration of a functional element resulting from mounting and demounting of the functional element immediately after cutting off the electric power from the constant-current power supply or during power supply operation, and it also inhibits an increase of the impedance during normal operation of the functional element.

Means for Solving the Problems

In order to solve the foregoing problems, the present invention provides:

an electric circuit for electrically connecting a constant-current power supply and a detachable functional element to each other, the constant-current power supply having a capacitance between an output terminal and a reference potential terminal, and the detachable functional element being configured to exhibit a predetermined function based on electric power from the constant-current power supply, comprising:

an element breakdown prevention circuit having a first circuit terminal connected to the output terminal of the constant-current power supply via the functional element and a second circuit terminal connected to the reference potential terminal of the constant-current power supply via the functional element, the electric circuit has a disconnected state in which the first circuit terminal and the output terminal of the constant-current power supply are electrically disconnected by demounting of the functional element and a connected state in which the first circuit terminal and the output terminal are electrically connected to each other by mounting of the functional element;

the element breakdown prevention circuit increases an impedance between the first circuit terminal and the second circuit terminal to a disconnected state impedance self-adjustingly in response to a state transition from the connected state to the disconnected state; and the element breakdown prevention circuit decreases the impedance between the first circuit terminal and the second circuit terminal self-adjustingly to a connected-state impedance that is lower than the disconnected-state impedance in response to a state transition from the disconnected state to the connected state.

Advantages of the Invention

In the electric circuit according to the present invention, the storage charge in the capacitor element starts to be discharged immediately after the state transition to the connected state and before the impedance between the first circuit terminal and the second circuit terminal completely changes to the connected-state impedance (in the case that it is substantially the disconnected-state impedance). Therefore, the electric circuit according to the present invention can prevent the discharge current due to the discharge from changing abruptly. This makes it possible to inhibit the functional element from breakdown and deterioration because of mounting and demounting of the functional element immediately after cut-off of driving power from a common constant-current power supply or during supply of driving power therefrom. Moreover, when the functional element is mounted and the functional element is operated in a normal condition, electric power is supplied thereto via the element breakdown prevention circuit in which the impedance between the first circuit terminal and the second circuit terminal is changed to a low impedance (connected-state impedance), and therefore, the energy loss resulting from the load of the element breakdown prevention circuit can be reduced.

BEST MODE FOR CARRYING OUT THE INVENTION

Hereinbelow, preferred embodiments of the electric apparatus according to the present invention are described in detail. The conceptual configuration of the present invention will be described first, and thereafter the specific configuration will be described with reference to the drawings.

An electric circuit according to the present invention is an electric circuit for connecting to each other a constant-current power supply having a capacitance between an output terminal and a reference potential terminal, and a detachable functional element for exhibiting a predetermined function based on electric power from the constant-current power supply, and it has an element breakdown prevention circuit having a first circuit terminal connectable to the output terminal of the constant-current power supply via the functional element, and a second circuit terminal connectable to the reference potential terminal of the constant-current power supply. The state in which the first circuit terminal and the output terminal of the constant-current power supply are electrically disconnected by demounting of the functional element is referred to as an "disconnected state", while the state in which the first circuit terminal and the output terminal are electrically connected by mounting of the functional element is referred to as a "connected state".

The term "reference potential" means a common potential to the constant-current power supply and the element breakdown prevention circuit that serves as a reference of voltage, and it is usually the ground potential. The phrase "connected to the reference potential terminal of the constant-current power supply" is not limited to the case that they are connected by a wiring line, but it may also include to mean that the constant-current power supply and the element breakdown prevention circuit are grounded separately.

The element breakdown prevention circuit increases an impedance between the first circuit terminal and the second circuit terminal to a disconnected state impedance self-adjustingly in response to a state transition from the connected state to the disconnected state. The element breakdown prevention circuit decreases the impedance between the first circuit terminal and the second circuit terminal self-adjustingly to a connected-state impedance that is lower than the disconnected-state impedance in response to a state transition from the disconnected state to the connected state. Here, the term "self-adjustingly" means that it is determined according to a circuit condition, for example, a voltage value of a predetermined location or a current value of a predetermined location without manual operations other than mounting of the functional element. Note that the electric charge stored in the capacitance starts to be discharged immediately after the state transition to the connected state and before the impedance between the first circuit terminal and the second circuit terminal changes to the connected-state impedance (substantially when in the disconnected-state impedance).

Examples of the element breakdown prevention circuit include a circuit for increasing the internal resistance of the electric apparatus at the time of mounting of the functional element self-adjustingly to that in a normal operating condition of the functional element, a circuit for slowing down the discharge itself, and combination circuits thereof.

In the case where no element breakdown prevention circuit is provided, at least a portion of the storage charge is discharged instantly even when the constant-current power supply is in a non-operating state. Therefore, the change over time of the discharge current results in a pointed (peak) waveform with a very short duration, and the maximum value (peak value) far exceeds the drive current value in a steady operating condition. However, the amount of discharge in that case (i.e., the amount of electric charge transferred) is approximately a constant amount according to the amount of storage charge and the drive voltage of the functional element, regardless of the presence or absence of the element breakdown prevention circuit. Accordingly, the peak value of the discharge current can be reduced by increasing the internal resistance of the electric apparatus or causing the discharging gently. As a result, the functional element can be prevented from the breakdown or damages resulting from excessive current passing therethrough. In addition, when the constant-current power supply is in an operating state, discharge current is superimposed to the supplied current from the power supply circuit other than the element breakdown prevention circuit, resulting in a further higher value, so the reduction rate of discharge current in the element breakdown prevention circuit needs to be made higher.

It is preferable that the element breakdown prevention circuit comprise:
  a switching element having a current entering terminal connectable to the functional element, a current exiting terminal connectable to the reference potential terminal of the constant-current power supply, and a control terminal for changing a resistance between the current entering terminal and the current exiting terminal; and
  a voltage-dependent type switching-control circuit for controlling the voltage of the control terminal based on a voltage change of the current entering terminal of the switching element,
  the switching-control circuit being configured to:
  change a resistance between the current entering terminal and the current exiting terminal from a predetermined connected-state resistance value in the connected state to a predetermined disconnected-state resistance value that is greater than the connected-state resistance value, based on a voltage change of the current entering terminal of the switching element in response to the state transition to the disconnected state; and change the resistance between the current entering terminal and the current exiting terminal from the disconnected-state resistance value to the connected-state resistance value, based on a voltage change of the current entering terminal of the switching element in response to the state transition to the connected state.

The term "switching element" means an element that can selectively exhibit at least two different resistance values. It may be either an element that selects two values, or an element that selects multi-level values, or an element that takes a continuously variable value. Examples of the switching element include an element that can control the resistance value by electrical action, such as a transistor, an element that can control the resistance value by optical action, such as a photocoupler, an element that can control the resistance value by magnetic action. The term "current entering terminal" means a terminal that electric current enters, (i.e., the terminal that electrons exit), such as a drain terminal or a collector terminal in the case of transistor. The term "current exiting terminal" means a terminal that electric current exits (i.e., the terminal that electrons enter), such as a source terminal or an emitter terminal in the case of transistor. The term "control terminal" means a terminal into which a current signal or a voltage signal for changing the resistance value between the current entering terminal and the current exiting terminal is fed, such as a gate terminal or a base terminal in the case of transistor.

With this configuration, the impedance between the first circuit terminal and the second circuit terminal is changed by controlling the resistance value using the switching element, and therefore, the impedance between the first circuit terminal and the second circuit terminal can be changed easily and reliably. Moreover, since the resistance value is controlled based on a voltage change of the current entering terminal of the switching element, the impedance between the first circuit terminal and the second circuit terminal can be controlled self-adjustingly in an easy and reliable manner.

It is preferable that the element breakdown prevention circuit comprise:

a switching element having a current entering terminal connected to the functional element, a current exiting terminal connected to the reference potential terminal of the constant-current power supply, and a control terminal for controlling a resistance value between the current entering terminal and the current exiting terminal; and a current-dependent type switching-control circuit for controlling the voltage of the control terminal based on a change of the current entering the current entering terminal of the switching element, the switching-control circuit being configured to:

change a resistance between the current entering terminal and the current exiting terminal from a predetermined connected-state resistance value in the connected state to a predetermined disconnected-state resistance value that is greater than the connected-state resistance value, based on a change of the current entering the first circuit terminal in response to the state transition to the disconnected state; and change the resistance between the current entering terminal and the current exiting terminal from the disconnected-state resistance value to the connected-state resistance value, based on a change of the current entering the first circuit terminal in response to the state transition to the connected state.

With this configuration, the impedance between the first circuit terminal and the second circuit terminal is changed by controlling the resistance value using the switching element, and therefore, the impedance between the first circuit terminal and the second circuit terminal can be changed easily and reliably. Moreover, since the resistance value is controlled based on a change of the current entering the first circuit terminal, the impedance between the first circuit terminal and the second circuit terminal can be controlled self-adjustingly in an easy and reliable manner.

It is preferable that the element breakdown prevention circuit further comprise an impedance decrease accelerating circuit for changing an impedance between the first circuit terminal and the second circuit terminal to an impedance lower than the connected-state impedance in response to the state transition to the connected state. A specific example includes a configuration further comprising a resistance eliminating circuit for changing the resistance between the current entering terminal and the current exiting terminal of the switching element to a resistance value lower than the connected-state resistance value in response to the state transition to the connected state.

This configuration makes it possible to suppress the increase of the load originating from the element breakdown prevention circuit during normal operation of the functional element further. Moreover, it is also possible to substantially prevent the increase of the load.

It is preferable that the element breakdown prevention circuit further comprise an impedance increase accelerating circuit for accelerating a change of the impedance between the first circuit terminal and the second circuit terminal that accompanies the state transition to the disconnected state. A specific example includes a configuration further comprising a resistance increase accelerating circuit for accelerating a change of the resistance between the current entering terminal and the current exiting terminal of the switching element that accompanies the state transition to the disconnected state.

With this configuration, when the transition to the disconnected state is performed, the impedance between the first circuit terminal and the second circuit terminal (i.e., the resistance between the current entering terminal and the current exiting terminal) can be increased at high speed, in other words, a complete transition of the switching element to the off-state can be preformed at high speed. As a result, the functional element can be prevented from breakdown or deterioration even when the transition to the connected state or the transition to the disconnected state is repeated within a short period of time. Thus, it is possible to inhibit chattering at the time of mounting and demounting of the functional element and the breakdown and deterioration originating from unexpected mounting and demounting of the functional element that are performed repeatedly.

It is preferable that the element breakdown prevention circuit further comprise:

a switching element having a current entering terminal connectable to the functional element, a current exiting terminal connectable to the reference potential terminal of the constant-current power supply, and a control terminal for changing a resistance between the current entering terminal and the current exiting terminal; and an additional circuit terminal connectable to the output terminal of the constant-current power supply in a process of mounting the functional element, and wherein the element breakdown prevention circuit changes a resistance between the current entering terminal and the current exiting terminal from a predetermined connected-state resistance value in the connected state to a predetermined disconnected-state resistance value that is greater than the connected-state resistance value, based on a voltage change of the additional circuit terminal in response to the state transition to the disconnected state; and the element breakdown prevention circuit changes the resistance between the current entering terminal and the current exiting terminal from the disconnected-state resistance value to the connected-state resistance value, based on a voltage change of the additional circuit terminal in response to the state transition to the connected state.

This configuration makes it possible to suppress the increase of the load originating from the element breakdown prevention circuit during normal operation of the functional element further. Moreover, it is also possible to substantially prevent the increase of the load.

Hereinbelow, preferred embodiments of the element breakdown prevention circuit according to the present invention will be described with reference to the drawings. Taking a case that the functional element is an LED as an example, various embodiments thereof will be described below.

Embodiment 1

An element breakdown prevention circuit of Embodiment 1 will be described. FIG. 1 is a circuit diagram illustrating one example of the element breakdown prevention circuit according to Embodiment 1. FIG. 1 also shows a constant-current power supply 1 and an LED 2 along with the element breakdown prevention circuit 10. It should be noted that in FIG. 1, a switch SW1 is not a switch element that is provided separately from the LED 2 but is a virtual switch for representing a transition between the connected state and the disconnected state of the LED 2. An example is the case in which the electric circuit includes a first input/output terminal electrically connected to an output terminal (an upper wiring terminal) of the constant-current power supply 1, a second input/output terminal, an LED 2, and a socket (not shown) to which the LED 2 is detachably fixed, and by mounting the LED 2 to the socket, the first input/output terminal and the second input/output terminal are electrically connected to each other while by demounting the LED 2 from the socket, these terminals are electrically disconnected. Accordingly, when the switch SW1 is in the on-state, it means a connected state, in which the LED 2 is electrically connected to the element breakdown prevention circuit 10, whereas when the switch SW1 is in the off-state, it means a disconnected state, in which the LED 2 is electrically disconnected from the element breakdown prevention circuit 10. This also applies to any switch SW1 in the following various embodiments.

Prior to describing the element breakdown prevention circuit 10, the constant-current power supply 1 and the LED 2 will be described. As illustrated in FIG. 1, the constant-current power supply 1 has a direct current power supply V serving as an electromotive force circuit, a current limiter circuit, connected in series with the direct current power supply V, for limiting the current supplied from the direct current power supply V to a predetermined maximum current value or lower, and an electrolytic capacitor C1 (one example of the capacitance) connected in parallel to the direct current power supply V and the current limiter circuit that are connected in series. The lower potential side of the direct current power supply V is grounded. When the constant-current power supply 1 is in the on-state (in an electric power supplying state), the electrolytic capacitor C1 stores electric charge (storage charge) according to its capacity and a voltage value (e.g., 30 [V (volts)]) of an output voltage V0 (a potential difference from the ground potential) of the constant-current power supply 1. Also when the constant-current power supply 1 is in the off-state (in an electric power supply stopping state), electric charge stays over a long time after the transition to the off-state, although the storage charge gradually decreases by self-discharge. The LED 2 emits light when a voltage of a predetermined operating threshold voltage value VF (e.g., 20 [V]) or higher is applied, and the emission light brightness becomes higher as the supplied current value becomes greater. When a current exceeding a rated maximum current value (e.g., 5 [A (ampere)]) is supplied thereto, the LED 2 may be broken, unable to emit light, or may be partially damaged, unable to perform normal light emission. The electromotive voltage of the direct current power supply V is equal to or higher than the operating threshold voltage value VF, and the current value (e.g., 1 [A]) of the output current I0 from the current limiter circuit is less than the rated maximum current value of the LED 2. The electrolytic capacitor C1 alleviates, even if it occurs, the adverse effects of abrupt fluctuation of the direct current power supply V, the output voltage V0 and the output current I0 of the current limiter circuit, and the like, in a steady operating condition of the LED 2. As a result, it inhibits the output voltage from the constant-current power supply 1 from decreasing to the operating threshold voltage value VF of the LED 2 or lower, and also inhibits the output current I0 thereof from increasing higher than the rated maximum current value of the LED 2. Moreover, it inhibits breakdown of and damages to the direct current power supply V and the current limiter circuit that result from the flyback current accompanying the transition from the connected state to the disconnected state, which is caused by demounting of the LED 2. Although FIG. 1 shows a case in which the electrolytic capacitor C1 is provided between the output terminal and the reference potential terminal of the constant-current power supply 1, it is also possible that a capacitor element such as the electrolytic capacitor C1 may not be actually connected thereto and a capacitance exists internally of the direct current power supply V or the current limiter circuit. In addition, although FIG. 1 shows a case in which the direct current power supply V is provided as an electromotive force circuit, it is also possible that the electromotive force circuit may be electromotive force circuit that converts AC electric power supplied externally into DC power or may be an electromotive force circuit that converts DC power supplied externally into a predetermined voltage or the like.

As illustrated in FIG. 1, the element breakdown prevention circuit 10 consists only of a transient current restraining circuit 11 connecting to each other a cathode terminal of the LED 2, which is on the opposite side from the constant-current power supply 1, and a ground potential terminal (a lower wiring terminal, one example of the reference potential terminal) of the constant-current power supply 1. The transient current restraining circuit 11 inhibits an abrupt change of transient current after the transition to the connected state, based on the voltage of the LED 2 and a drain terminal (one example of the current entering terminal and the first circuit terminal) of a field effect transistor Q1. Here, the phrase "the transient current after the transition to the connected state" means a current passing through the LED 2 during a transient period that is after the transition to the connected state by mounting of the LED 2 until the steady state. The transient current is the total current of the current supplied from the direct current power supply V via the current limiter circuit (hereinafter referred to as "basic current") and the current originating from the discharge of the electrolytic capacitor C1 ("discharge current"), in the case where the constant-current power supply 1 is in the on-state. It is identical to the current originating from the discharge of the electrolytic capacitor C1 in the case where the constant-current power supply 1 is in the off-state (in the electric power supply stopping state). It should be noted that in the following, only the case that the LED 2 is mounted when the constant-current power supply 1 is in the on-state will be discussed in detail. The reason is that, when the breakdown and deterioration of the LED 2 caused by mounting of the LED 2 during the on-state of the constant-current power supply 1 can be prevented, the breakdown and deterioration of the LED 2 caused by mounting of the LED 2 during the off-state of the constant-current power supply 1 can reliably be prevented because there are no adverse effects due to the current supplied from the direct current power supply V.

The transient current restraining circuit 11 has a field-effect transistor Q1 (one example of the "switching element") and a gate control circuit (one example of the "voltage-dependent type switching-control circuit") for suppressing transient current and controlling the voltage of the gate terminal (one example of the control terminal) of the field-effect transistor Q1. The drain terminal (one example of the current entering terminal) of the field-effect transistor Q1 is connected to the LED 2, the source terminal (one example of the current exiting terminal) is connected to the ground potential terminal. The gate control circuit includes a resistor R1 connecting the gate terminal of the field-effect transistor Q1 and one end of the LED 2, a capacitor C2 connecting the gate terminal and the ground potential terminal, and a resistor R2 connecting the gate terminal and the ground potential terminal. The resistor R1 and the capacitor C2 mainly construct a circuit portion for suppressing transient current and controlling the transition of the field-effect transistor Q1 to the on-state. The resistor R2 mainly constructs a circuit portion for controlling the transition of the field-effect transistor Q1 to the off-state.

Here, the operation of the element breakdown prevention circuit 10 (the transient current restraining circuit 11) will be described. FIG. 2 shows timing charts qualitatively illustrating one example of the operation of the element breakdown prevention circuit 10, wherein FIG. 2(A) shows a change over time of the current passing through the LED 2, FIG. 2(B) shows a change over time of the voltage across the terminals of the capacitor C2, and FIG. 2(C) shows a change over time of the source-to-drain resistance of the field-effect transistor Q1. It should be noted that FIG. 2 shows only the operation in the case where the transition from the disconnected state to the connected state occurs in response to mounting of the LED 2. In FIG. 2(A), a change over time of the current passing through the LED when the transient current restraining circuit 11 is not provided is represented by the dash-dot line, for reference purposes. The same applies to the timing charts that are referred to in the later-described other embodiments.

First, as illustrated in FIG. 1, in a steady phase of the disconnected state, in which the constant-current power supply 1 is in the on-state and which is after a predetermined time later the transition to the disconnected state (the off-state of SW1) by demounting of the LED 2: the voltage of the electrolytic capacitor C1 is equal to the voltage value of the output voltage V0 of the constant-current power supply 1; the voltage value of the voltage $V_{C2}$ across the terminals of the capacitor C2 is Vn [V] (Vn=0); and the field-effect transistor Q1 is in the off-state and the resistance value of the source-to-drain resistance $R_{Q1}$ is Rn [Ω (ohm)]. On the other hand, in a steady phase of the connected state, in which the constant-current power supply 1 is in the on-state and which is after a predetermined time later the transition to the connected state (the on-state of SW1) by mounting of the LED 2: the voltage of the electrolytic capacitor C1 is V0 [V], which is equal to the output voltage value of the constant-current power supply 1; the voltage value of the voltage $V_{C2}$ across the terminals of the capacitor C2 is Vs [V]; and the field-effect transistor Q1 is in the on-state and the resistance value of the source-to-drain resistance $R_{Q1}$ is Rs [Ω].

When mounting of the LED 2 is started and the transition from the disconnected state to the connected state occurs (time $t_0$), the transient current including the basic current originating from the direct current power supply V and the discharge current originating from the electrolytic capacitor C1 starts to be supplied to the closed circuit immediately after the connection transition, which corresponds to the case in which the source terminal and the drain terminal of the field-effect transistor Q1 are open.

Even when the supply of the transient current is started, the resistor R1 and the capacitor C2 connected in series in the closed circuit immediately after the connection transition inhibit abrupt increase of the transient current passing through the LED 2. Therefore, the current value of the transient current $I_{LED}$ is a very small value In [A] immediately after the transition to the connected state, as illustrated in FIG. 2(A). It should be noted that, when the transient current restraining circuit 11 is not provided and the cathode terminal of the LED 2 is connected to the ground potential terminal of the constant-current power supply 1, an instantaneous current with a pointed waveform, which has the maximum value Im [A] (e.g., Im=28) far exceeding the current value Is [A] (e.g., Is=1) of the output current I0 during normal operation of the LED 2, passes through the LED 2, as represented by the dash-dot line in FIG. 2(A).

The capacitor C2 is charged by the transient current according to the elapse of the time from the transition to the connected state, as illustrated in FIG. 2(B), and the voltage $V_{C2}$ of the capacitor C2 gradually increases from Vn [V] to Vs [V] (time $t_s$). Thereafter, the voltage $V_{C2}$ of the capacitor C2 keeps at Vs [V].

According to this charge, the gate voltage of the field-effect transistor Q1 (equal to the voltage $V_{C2}$ of the capacitor C2) increases, and as a result, the source-drain resistance value gradually decreases from Rn [Ω] to Rs [Ω], as illustrated in FIG. 2(C) (time $t_s$). Thereafter, the source-drain resistance value keeps at Rs [Ω]. Substantially, the resistance value of the source-to-drain resistance $R_{Q1}$ does not substantially start to decrease until the gate voltage of the field-effect transistor Q1 exceeds a predetermined threshold voltage.

As illustrated in FIG. 2(A), the current value of the transient current $I_{LED}$ slightly increases from In [A] at the initial stage of the transient period, because a current path via the resistor R2 forms after the supply of the transient current $I_{LED}$ starts and also a diverted current component of the transient current $I_{LED}$ flowing via the current path increases according to the increase of the voltage $V_{C2}$ of the capacitor C2. At this initial stage, the field-effect transistor Q1 keeps in the off-state, so the resistance value of the source-to-drain resistance $R_{Q1}$ is far greater than the combined resistance value of the resistor R1 and the resistor R2 connected in series. Therefore, it almost does not function as a current path of the transient current $I_{LED}$. However, thereafter, when the resistance value of the source-to-drain resistance $R_{Q1}$ becomes smaller than the combined resistance value of the resistor R1 and the resistor R2 as the voltage $V_{C2}$ of the capacitor C2 increases, and the current path through the field-effect transistor Q1 becomes dominant as the current path of the transient current $I_{LED}$ over the current path through the resistor R1 and the resistor R2. Consequently, as illustrated in FIG. 2(A), the current abruptly increases to Is [A] in response to the abrupt decrease of the resistance value of the source-to-drain resistance $R_{Q1}$ (time $t_s$). Thereafter, a steady-state current with a current value of Is [A] is supplied to the LED 2.

In a steady phase of the connected state, in which a steady-state current is supplied to the LED 2, substantially, a closed circuit corresponding to the case in which a resistor with a resistance value Rs [Ω] far lower than the combined resistance of the resistor R1 and the resistor R2 is provided between the LED 2 and the ground potential terminal of the constant-current power supply 1 is formed in place of the transient current restraining circuit 11.

On the other hand, when demounting of the LED 2 starts and the transition from the connected state to the disconnected state occurs, the capacitor C2 starts to discharge via the resistor R2. Because of this discharge, the voltage $V_{C2}$ of the capacitor C2 decreases from Vs [V] to Vn (=0) [V], and thereafter keeps at Vn [V]. Also, the resistance value of the source-to-drain resistance $R_{Q1}$ increases from Rs [Ω] to Rn [Ω] in response to the decrease of the voltage value of the gate voltage of the field-effect transistor Q1 according to the decrease of the potential $V_{C2}$ across the terminals of the capacitor C2, and thereafter it keeps at Rn [Ω].

In the element breakdown prevention circuit 10 (the transient current restraining circuit 11) of the present embodiment, a current path through the resistor R1 and the capacitor C2 connected in series is formed as the main current path of the transient current at the initial stage of the transient period after the transition to the connected state caused by mounting of the LED 2, and the resistance value of the source-to-drain resistance $R_{Q1}$ of the field-effect transistor Q1, which thereafter serves as the main current path of the transient current, gradually decreases. As a result, the element breakdown prevention circuit 10 of the invention can inhibit abrupt changes of the transient current and prevent the flow of instantaneous current exceeding the rated maximum current value of the LED 2, substantially the current value Is [A] in the steady phase of the connected state. Thereby, even when the LED 2 is mounted or demounted while the constant-current power supply 1 is being in an electric power supply state, the LED 2 is prevented from being damaged or deteriorated. Moreover, in the steady phase after the transition to the connected state by mounting of the LED 2, the current path between the source and the drain of the field-effect transistor Q1 that is in the on-state is formed as the main current path of the steady-state current. As a result, an increase of the load of the element breakdown prevention circuit 10 itself is prevented during normal operation of the LED 2. This also inhibits an increase of the power consumption, heat generation, and the like. The formation of the main path of the transient current and the formation of the main current path of the steady-state current are automatically carried out based on the circuit condition of the element breakdown prevention circuit 10 itself, specifically, based on controlling by the field-effect transistor Q1 according to the voltage of the line between the field-effect transistor Q1 and the LED 2. Therefore, when replacing the LED 2, no additional manual work is necessary other than the mounting and demounting of the LED. Furthermore, the capacitor C2 for inhibiting the abrupt change of the transient current is also used for controlling the gate voltage of the field-effect transistor Q1. Thereby, the circuit configuration of the element breakdown prevention circuit 10 can be simplified.

The foregoing has described a case in which the transient current restraining circuit 11 includes the field-effect transistor Q1, the resistor R1, the resistor R2, and the capacitor C1. However, it is also possible to employ a configuration in which the main current path of the steady-state current in the steady phase of the connected state is a current path through the field-effect transistor Q1 being in the on-state, and, at least at the initial stage of the transient period of the connected state, the main current path of the transient current may be a current path other than the field-effect transistor Q1 but at least through a resistance element. Moreover, in the foregoing, the circuit configuration is simplified by using the capacitor C2 for both an element that forms a portion of the circuit for preventing an abrupt change of the transient current and an element that forms a portion of the circuit for controlling the gate voltage of the field-effect transistor Q1. However, it is also possible that each of the circuits contain a separate capacitor.

Embodiment 2

An element breakdown prevention circuit according to Embodiment 2 has a configuration that can reduce the load due to the element breakdown prevention circuit itself in the steady phase of the connected state, in comparison with the element breakdown prevention circuit 10 according to Embodiment 1. FIG. 3 is a circuit diagram illustrating one example of the element breakdown prevention circuit according to Embodiment 2. The element breakdown prevention circuit 20 of the present embodiment has the same configuration as that of the element breakdown prevention circuit 10 (see FIG. 1) in Embodiment 1 above, except that it contains a resistance eliminating circuit 22. In the following description, the same parts as those in Embodiment 1 are denoted by the same reference numerals, and are not elaborated upon further.

The element breakdown prevention circuit 20 further includes a resistance eliminating circuit 22 (one example of the impedance decrease accelerating circuit: one example of a portion of the "voltage-dependent type switching-control circuit") for further increasing the voltage value of the gate voltage of the field-effect transistor Q1 in a steady connected state to reduce the resistance value of the source-to-drain resistance and substantially eliminate the resistance. In the present embodiment, the transition controlling for turning the field-effect transistor Q1 to the on-state is carried out by using both the circuit portion comprising the resistor R1 and the capacitor C2 and the resistance eliminating circuit 22.

The resistance eliminating circuit 22 comprises: a circuit portion containing a Zener diode ZD1, a resistor R3, and a resistor R4, which are disposed in series so as to connect the output terminal and the ground potential terminal of the constant-current power supply 1; and a circuit portion containing a resistor R5, a resistor R6, and a transistor Q2, which are disposed in series so as to connect the output terminal and the ground potential terminal, a Zener diode ZD2 connecting a line between the resistor R5 and the resistor 6 to the ground potential terminal, and a diode D1 connecting a line between the resistor 6 and the transistor Q2 to the gate terminal of the field-effect transistor Q1. The emitter terminal of the transistor Q2 is connected to the resistor R2, and the base terminal thereof is connected to a line between the resistor R3 and the resistor R4. The circuit portion containing the Zener diode ZD1, the resistor R3, and the resistor R4 mainly controls the state transition of the transistor Q2 between the on-state and the off-state in response to a change of the output voltage V0. The other circuit portion mainly constitutes a circuit portion for controlling the state transition of the field-effect transistor Q1 to the on-state in response to the transition of the transistor Q2 to the off-state.

In the steady state of the disconnected state shown in FIG. 3: the voltage across the terminals of the electrolytic capacitor C1 is equal to the voltage value of the output voltage V0 of the constant-current power supply 1; the voltage value of the voltage $V_{C2}$ across the terminals of the capacitor C2 is Vn [V] (Vn=0); the field-effect transistor Q1 is in the off-state and the resistance value of the source-to-drain resistance $R_{Q1}$ thereof is Rn [Ω (ohm)]. The Zener diode ZD1 keeps at the break-through voltage, and the transistor Q2 keeps in the on-state by the voltage value between the resistor R3 and the resistor R4, which is obtained by resistively dividing a voltage obtained by subtracting the break-through voltage of the Zener diode ZD1 from the output voltage V0 by the resistor R3 and the resistor R4.

On the other hand, in a steady phase of the connected state, in which the constant-current power supply 1 is in the on-state and which is after a predetermined time later the transition to the connected state (the on-state of SW1) by mounting of the LED 2: the voltage across the terminals of the electrolytic capacitor C1 is V0 [V], which is equal to the output voltage value of the constant-current power supply 1; the voltage value of the voltage $V_{C2}$ across the terminals of the capacitor C2 is Vs [V]; and the field-effect transistor Q1 is in the on-state and the effective resistance value of the source-to-drain resistance $R_{Q1}$ is Rs' [Ω (ohm)]. The current through the Zener diode ZD1, the current through the transistor Q2, and the current through the diode D1 are substantially cut off. The various circuit elements are selected in order that such operations in the steady phases of the connected state and the disconnected state can be realized.

FIG. 4 shows timing charts qualitatively illustrating one example of the operation of the element breakdown prevention circuit 20, wherein FIG. 4(A) shows a change over time of the current passing through the LED, FIG. 4(B) shows a change over time of the voltage across the terminals of the capacitor C2, and FIG. 4(C) shows a change over time of the source-to-drain resistance of the field-effect transistor.

When mounting of the LED 2 is started and the transition from the disconnected state to the connected state occurs (time $t_0$), the transient current $I_{LED}$ starts to be supplied. An abrupt increase of the transient current $I_{LED}$ passing through the LED 2 is inhibited by the same operation principle as in Embodiment 1 above. The capacitor C2 is charged by the transient current according to the elapse of the time from the transition to the connected state, as illustrated in FIG. 4(B), and the voltage $V_{C2}$ across the terminals of the capacitor C2 gradually increases from Vn [V] to Vs [V] (time $t_s$). According to this charge, the voltage value of the gate voltage of the field-effect transistor Q1 (equal to the voltage $V_{C2}$ across the terminals of the capacitor C2) increases, and as a result, the resistance value of the source-drain resistance $R_{Q1}$ gradually decreases from Rn [Ω] to Rs [Ω], as illustrated in FIG. 4(C) (time $t_s$). The transient phenomena up to this stage are qualitatively the same as those in Embodiment 1 above.

As the resistance value of the source-to-drain resistance $R_{Q1}$ decreases, the combined resistance external to the constant-current power supply 1 lowers, so the voltage value of the output voltage V0 decreases. At this point, the source-to-drain voltage of the field-effect transistor Q1 decreases to the same voltage as the source-to-gate voltage at which the field-effect transistor Q1 can keep the on-state. According to the decrease of the voltage value of the output voltage V0, its voltage value becomes lower than the break-through voltage value of the Zener diode ZD1, and the current from the output terminal to the Zener diode ZD1 is cut off (time $t_s$). By this cutting off of the current, the voltage of the line between the resistor R3 and the resistor R4 is brought to substantially the ground potential, and the transistor Q2 is turned to the off-state. By this transition, the capacitor C2 is further charged by the current supplied via the resistor R5, the resistor R6, and the diode D1, as illustrated in FIG. 4(B), and the voltage $V_{C2}$ across the terminals of the capacitor C2 is increased further to Vs' [V] (time $t_s'$). Thereafter, the voltage $V_{C2}$ of the capacitor C2 is kept at Vs' [V]. Also, by this charging, the resistance value of the source-to-drain resistance $R_{Q1}$ of the field-effect transistor Q1 decreases to Rs' [Ω] (Rs≈0) (time $t_s'$). Thereafter, the source-drain resistance $R_{Q1}$ is kept at Rs' [Ω]. The change of the current value of the transient current $I_{LED}$ is qualitatively the same as that in Embodiment 1 above.

The element breakdown prevention circuit 20 according to the present embodiment can further reduce the resistance value of the source-to-drain resistance $R_{Q1}$ of the field-effect transistor Q1 in comparison with the element breakdown prevention circuit 10 of Embodiment 1 above, and therefore, it can inhibit an increase of the load originating from the element breakdown prevention circuit 20 during normal operation of the LED 2 still more desirably. Moreover, it can reduce the resistance value of the source-to-drain resistance $R_{Q1}$ of the field-effect transistor Q1 to substantially zero [Ω], so it can inhibit an increase of the load originating from the element breakdown prevention circuit 20 very desirably in comparison with the conventional configuration, which is not provided with the element breakdown prevention circuit 20 (see FIG. 12(B)).

Although the foregoing has described a case in which the resistance eliminating circuit 22 shown in FIG. 3 controls the gate voltage of the field-effect transistor Q1 in the steady phase of the connected state to a higher voltage value than in the case in which the resistance eliminating circuit 22 is not provided, it is possible to employ any configuration as long as it can control the voltage value of the gate voltage to a high voltage value.

Embodiment 3

An element breakdown prevention circuit 40 according to Embodiment 3 has a configuration that can prevent an LED (functional element) from breakdown and deterioration when mounting or demounting the functional element even if the transition from the connected state to the disconnected state or vice versa takes place a plurality of times at a very short time interval when mounting or demounting the functional element. FIG. 5 is a circuit diagram illustrating one example of the element breakdown prevention circuit according to Embodiment 3. The element breakdown prevention circuit 40 of the present embodiment shown in FIG. 5 has the same configuration as that of the element breakdown prevention circuit 20 (see FIG. 3) in Embodiment 2 above, except that it contains a resistance increase accelerating circuit 43 (one example of the impedance increase accelerating circuit: one example of a portion of the "voltage-dependent type switching-control circuit"). In the following description, the same parts as those in Embodiment 2 are denoted by the same reference numerals, and are not elaborated upon further.

The resistance increase accelerating circuit 43 is mainly a circuit for discharging the capacitor C2 in the transient current restraining circuit 11 forcibly. In the present embodiment, the transition controlling for turning the field-effect transistor Q1 to the off-state is carried out by using both the circuit portion comprising the resistor R2 and the resistance increase accelerating circuit 43. Specifically, the resistance increase accelerating circuit 43 is a circuit for discharging the capacitor C2 at a higher speed than when discharging the capacitor C2 by the resistor R2 in the transient current restraining circuit 11, based on the voltage of a circuit terminal of the transient current restraining circuit 11 that is connectable to the LED 2.

It comprises: a circuit portion containing a resistor R10 and a resistor R8 disposed in series so as to connect a circuit terminal of the transient current restraining circuit 11 that is connectable to the LED 2 to the ground potential terminal of the constant-current power supply 1; a circuit portion containing a resistor R7 and a transistor Q3 being controlled in response to the voltage of the line between the resistor R8 and the resistor R10, that are disposed in series so as to connect a line between the resistor R5 and the resistor R6 of the resistance eliminating circuit 22 to the ground potential terminal; a circuit portion containing a capacitor C3 and a resistor R9 disposed in series so as to connect a line between the resistor R7 and the transistor Q3 to the ground potential terminal; and a circuit portion containing a transistor Q4 controlled in response to the voltage of the line between the capacitor C3 and the resistor R9 and connecting the cathode terminal of the diode D1 of the resistance eliminating circuit 22 (a line between the resistor R1 and the resistor R2) to the ground potential terminal. The collector terminal of the transistor Q3 is connected to the resistor R7, the emitter terminal is connected to the ground potential terminal of the constant-current power supply 1, and the base terminal is connected to a line between the resistor R10 and the resistor R8. The collector terminal of the transistor Q4 is connected to a line between the diode D1 and the capacitor C2 in the transient current restraining circuit 11.

In the steady phase of the disconnected state shown in FIG. 5, the transistor Q3 is in the off-state, and since the transistor Q3 is in the off-state, the transistor Q4 is also in the off-state. The other circuit conditions are the same as those in Embodiment 2 above. On the other hand, in the steady phase of the connected state, the transistor Q3 is in the on-state, and the transistor Q4 is also in the off-state. The voltage value of the output voltage V0 of the constant-current power supply 1 in the disconnected state is higher than that in the connected state.

When the transition from the connected state to the disconnected state takes place, the current through the resistor R1 and the resistor R10 is cut off. Because of the cutting-off of the current through the resistor R1, the capacitor C2 starts to discharge through the resistor R2. The discharge through the resistor R2 takes place gently. On the other hand, by the cutting off of the current through the resistor R10, the base voltage of the transistor Q3 is brought to substantially the ground potential, and the transistor Q3 is turned to the off-state. Since the transistor Q3 turns to the off-state, the transistor Q4 turns to the on-state, and the capacitor C2 starts to discharge through the transistor Q4 (between the collector terminal and the emitter terminal). The collector-emitter resistance $R_{Q1}$ of the transistor Q4 is far lower than the resistance of the resistor R2, so the discharge of the capacitor C2 can be performed at high speed. However, since the capacitor C3 exists, the on-state of the transistor Q4 is only temporary, and after the transistor Q4 turns to the on-state temporarily, it automatically turns to the off-state again. More specifically, since the capacitor C3 cuts off the DC component, a change of the output voltage V0 resulting from the presence or absence of the LED 2 is passed from the capacitor C3 to the base terminal of the transistor Q4 via the resistor R5 and the resistor R7, turning the transistor Q4 to the on-state. When the change of the output voltage V0 disappears, the current from the resistor R5, the resistor R7, and the capacitor C3 vanishes, turning the transistor Q4 to the off-state. Thus, the transistor Q4 is turned to the on-state only during the change of the output voltage V0 at the instant of the state transition from the connected state to the disconnected state, and it is kept in the off-state during the connected state and even during the disconnected state when the output voltage V0 is stable.

Conversely, when the transition takes place from the disconnected state to the connected state, the output voltage V0 decreases, and also the supply of the transient current starts via the resistor R1 and the resistor R10. When the diverted current of the transient current passing through the resistor R10 increases, the base voltage of the transistor Q3 rises, and when the current value of the diverted current of the transient current exceeds a predetermined current value, the transistor Q3 turns to the on-state. In response to the transition of the transistor Q3 to the on-state, the capacitor C3 is substantially completely discharged, and according to this discharge, the base voltage of the transistor Q4 is brought to substantially the ground potential. Thereby, the transistor Q4 is turned to the off-state reliably. Thus, the operation after the transition to the connected state is performed as in Embodiment 2 above.

Now, the following describes a case in which, in mounting of the LED 2, the transition to the connected state occurs one time, then the transition from the connected state to the disconnected state takes place, and shortly thereafter, the transition to the connected state takes place again. Assuming that the resistance increase accelerating circuit 43 is not provided, if there is no sufficient time for discharging the capacitor C2 in order to turn the field-effect transistor Q1 to the off state although the field-effect transistor Q1 turns to the on-state by the transition to the connected state and thereafter turns to the disconnected state, the field-effect transistor Q1 being in the on-state is connected to the LED 2 when being turned to the connected state again. As a consequence, it is possible that an abrupt increase of the transient current may not be suppressed at the time of the transition to the connected state. In contrast, with the present embodiment, the capacitor C2 can be discharged at high speed at the time of the transition to the disconnected state, in other words, the transition of the field-effect transistor Q1 to the complete off-state can be conducted at high speed. Therefore, the LED 2 can be prevented from breakdown and deterioration even under the above-described situation.

The element breakdown prevention circuit 40 according to the present embodiment can further inhibit chattering at the time of mounting and demounting of the LED and the breakdown and deterioration of the LED 2 resulting from repeated mounting and demounting of the LED, in comparison with the element breakdown prevention circuit 20 of Embodiment 2 above.

Although the foregoing has described a case in which the discharge of the capacitor C2 is performed by using both the transient current restraining circuit 11 and the resistance increase accelerating circuit 43, it is also possible to employ the configuration in which the discharge of the capacitor C2 is controlled only by the resistance increase accelerating circuit 43. In that case, the resistor R2 in the transient current restraining circuit 11 may be eliminated. In addition, as in the element breakdown prevention circuit 50 shown in FIG. 6, the resistor R2 may not be provided, and it is possible to provide a diode D2 between the first circuit terminal and the resistor R1 or provide a correction resistor R11 between the first circuit terminal and the drain terminal of the field-effect transistor Q1, in order to control the field-effect transistor Q1 with high precision.

Although the foregoing has described a case in which the discharge of the capacitor C2 is made faster at the time of the transition from the connected state to the disconnected state by the resistance increase accelerating circuit 43, the resistance increase accelerating circuit of the present invention may have any configuration as long as the transition of the switching element (the field-effect transistor Q1) from the on-state to the off-state can be made faster.

Embodiment 4

An element breakdown prevention circuit according to Embodiment 4 has a configuration for controlling a switching element (the field-effect transistor Q1) based on a voltage, as in Embodiments 1 through 3 above. FIG. 7 is a circuit diagram illustrating one example of the element breakdown prevention circuit according to Embodiment 4.

In the element breakdown prevention circuit 60 shown in FIG. 7, first, the transient current flows through a resistor R12 when the transition to the connected state occurs. The current flowing through the resistor R12 is very small, and this inhibits an abrupt change of the transient current. In response to a voltage change at the cathode terminal of the LED 2, the transistor Q4 turns to the on-state. When the transistor Q4 turns to the on-state, the voltage of the line between a resistor R14 and the collector terminal of the transistor Q4 decreases, bringing the base voltage of the transistor Q5 to substantially the ground potential and turning the transistor Q5 to the off-state. Thereby, in the circuit comprising a resistor R15, a resistor R16, and a capacitor C4, the voltage of the line between the resistor R15 and the resistor R16 gradually increases. In response to this, the gate voltage of the field-effect transistor Q1 increases, and when it exceeds a predetermined value, the field-effect transistor Q1 turns to the on-state. Thereafter, the steady phase of the connected state is entered.

On the other hand, when the transition to the disconnected state occurs, the current passing through a resistor R13 and the resistor R12 is cut off, and the base voltage of the transistor Q4 is brought to substantially the ground potential. Thereby, the transistor Q4 is turned to the off-state. In response to the transition of the transistor Q4 to the off state, the transistor Q5 turns to the on-state, and thereafter, the steady phase of the disconnected state is entered.

The just-described configuration also achieves substantially the same advantageous effects as achieved by Embodiments 1 through 3 above.

Embodiment 5

An element breakdown prevention circuit according to Embodiment 5 has a configuration in which the switching element is controlled based on current, unlike those in Embodiments 1 through 4 above. FIG. 8 is a circuit diagram illustrating one example of the element breakdown prevention circuit according to Embodiment 5. The element breakdown prevention circuit 70 according to the present embodiment includes, as illustrated in FIG. 8, the field-effect transistor Q1 ([switching element]) and a gate control circuit (one example of the current-dependent type gate control circuit) for controlling the gate voltage of the field-effect transistor Q1, constituted by elements other than the field-effect transistor Q1. In the element breakdown prevention circuit 70, a transient current restraining circuit 71 is a circuit, like the above-described transient current restraining circuit 11 (see FIG. 1), mainly for restraining transient current and performing basic controlling of the state transition of the field-effect transistor Q1 to the on-state and to the off-state. In addition, a resistance increase accelerating circuit 73 (one example of the impedance increase accelerating circuit) is, like the above-described resistance increase accelerating circuit 43 (see FIG. 5), a circuit for making the state transition of the field-effect transistor Q1 to the off-state faster.

In the steady state of the disconnected state shown in FIG. 8, a transistor Q7 is in the off-state, and the voltage divided by a resistor R21 and a resistor R19 with the output voltage V0 is applied to the base terminal of a transistor Q6. Accordingly, the transistor Q6 is in the on-state, and since the transistor Q6 is in the on-state, the transistor Q1 is in the off-state.

When the transition from the disconnected state to the connected state takes place ($t_0$), transient current starts to flow through R18 and R20 since the transistor Q1 is in the off-state, as illustrated in FIG. 9(D). Since the transient current flows out through the resistor R18 and the resistor R20, an abrupt increase of the transient current can be suppressed. As the transient current increases, a drop voltage in the resistor R18 increases, and accordingly, the base voltage of the transistor Q7 increases. When the base voltage increases and reaches a predetermined voltage value or higher, the transistor Q7 turns to the on-state. In response to the transition to the on-state of the transistor Q7, the voltage value of the base voltage of the transistor Q6 (equal to the voltage $V_{R19}$ of the resistor R19) turns substantially from V1 [V] to the ground potential (V0 [V]), as illustrated in FIG. 9(A), and the transistor Q6 turns to the off-state. As a result of the transition to the off-state of the transistor Q6, charging of the capacitor C2 starts through the resistor R1, and the voltage $V_{C2}$ across the terminals of the capacitor C2 increases, as illustrated in FIG. 9(C). It should be noted that when the transistor Q6 is in the on-state, the current passing through the resistor R1 flows substantially only through the transistor Q6. As illustrated in FIG. 9(D), when the gate voltage of the field-effect transistor Q1 (equal to the voltage $V_{C2}$ across the terminals of the capacitor C2) increases and the gate voltage becomes a predetermined voltage or higher, the field-effect transistor Q1 turns to the on-state, and after the transition of the field-effect transistor Q1 to the on-state, the resistance value of the source-to-drain resistance $R_{Q1}$ of the field-effect transistor Q1 decreases to Rs' [Ω] according to the increase of the gate voltage.

In the element breakdown prevention circuit 70 of the present embodiment, a current path through the resistor R18 and the resistor R20 is formed as the main current path of the transient current at the initial stage of the transient period after the transition to the connected state caused by mounting of the LED 2, and the resistance value of the source-to-drain resistance $R_{Q1}$ of the field-effect transistor Q1, which thereafter serves as the main current path of the transient current, gradually decreases. As a result, the element breakdown prevention circuit 70 of the invention can inhibit abrupt changes of the transient current and prevent the flow of instantaneous current exceeding the rated maximum current value of the LED 2, substantially the current value Is [A] in the steady phase of the connected state. Thereby, even when the LED 2 is mounted or demounted while the constant-current power supply 1 is being in an electric power supply state, the LED 2 is prevented from being damaged or deteriorated. Moreover, in the steady phase after the transition to the connected state by mounting of the LED 2, the current path between the source and the drain of the field-effect transistor Q1 that is in the on-state is formed as the main current path of the steady-state current. As a result, an increase of the load of the element breakdown prevention circuit 70 is prevented during normal operation of the LED 2. This also inhibits an increase of the power consumption, heat generation, and the like. The formation of the main path of the transient current and the formation of the main current path of the steady-state current are automatically carried out based on the circuit condition of the element breakdown prevention circuit 70 itself, specifically, based on controlling by the field-effect transistor Q1 according to the output current from the LED 2. Therefore, when replacing the LED 2, no additional manual work is necessary other than the mounting and demounting of the LED.

The foregoing has described a case in which the transient current restraining circuit 11 includes the field-effect transistor Q1, the resistor R1, the resistor R2, and the capacitor C2. However, it is also possible to employ a configuration in which the main current path of the steady-state current in the steady phase of the connected state is a current path through the field-effect transistor Q1 being in the on-state, and, at least at the initial stage of the transient period of the connected state, the main current path of the transient current may be a current path other than the field-effect transistor Q1 but at least through a resistance element. Moreover, in the foregoing, the circuit configuration is simplified by using the capacitor C2 for both an element that forms a portion of the circuit for preventing an abrupt change of the transient current and an element that forms a portion of the circuit for controlling the gate voltage of the field-effect transistor Q1. However, it is also possible that each of the circuits contain a separate capacitor.

Embodiment 6

An element breakdown prevention circuit according to Embodiment 6 has a configuration in which transient current is restricted by using a mechanical change in the connection states. FIG. 10 is a circuit diagram illustrating one example of the element breakdown prevention circuit according to Embodiment 6. The element breakdown prevention circuit 80 of the present embodiment contains only a transient current restraining circuit 81. The transient current restraining circuit 81 includes, as illustrated in FIG. 10, the field-effect transistor Q1 (switching element) and a gate control circuit (one example of the voltage-dependent type gate control circuit) for controlling the gate voltage of the field-effect transistor Q1, constituted by elements other than the field-effect transistor Q1. In the element breakdown prevention circuit 80, the transient current restraining circuit 81 is a circuit, like the above-described transient current restraining circuit 11 (see FIG. 1), mainly for restraining transient current and performing controlling of the state transition of the field-effect transistor Q1 to the on-state and to the off-state. The configuration is such that the resistor R1, which forms the current supply path to the capacitor C2 that substantially controls the gate voltage of the field-effect transistor Q1 of the transient current restraining circuit 11 (see FIG. 1), has a different contact point P4.

When mounting of the LED 2 is started, a contact point P2 and a contact point P4 first come into contact with each other ($t_0$). Thereafter, a contact point P1 and a contact point P3 come into contact with each other ($t_0'$), and mounting of the LED 2 finishes. When the contact point P2 and the contact point P4 come into contact with each other, transient current flows through the resistor R1 and the capacitor C2, and charging to the capacitor C2 starts, as illustrated in FIG. 11(B). Since the transient current flows out through the resistor R1 and the capacitor C2, an abrupt increase of the transient current can be suppressed. Thereafter, the state transition from the disconnected state to the connected state takes place by the contacting of the contact point P1 and the contact point P3. In this state transition, there is almost no adverse effects originating from instantaneous current because a closed circuit in which transient current flows is already formed. The following operation is qualitatively the same as the transient phenomena in Embodiment 1 above, as illustrated in FIGS. 11(A) to 11(C). Since one end of the resistor R1 of the element breakdown prevention circuit 80 (the opposite side to the side connected to the gate terminal of the field-effect transistor Q1) is connected to the anode terminal of the LED 2, the gate voltage of the field-effect transistor Q1 can be made higher than in the element breakdown prevention circuit 10 (see FIG. 1) in which one end of the resistor R1 is connected to the cathode terminal of the LED, and as a result, the source-to-drain resistance $R_{Q1}$ can be lowered.

Although the foregoing has described a case in which the contact point P1 and the contact point P3 come into contact with each other after the contact point P2 and the contact point P4 come into contact with each other, it is also possible to employ the configuration in which the contact point P1 and the contact point P3 are brought into contact with each other first and thereafter the contact point P2 and the contact point P4 are brought into contact with each other. In this configuration as well, qualitatively the same controlling as in the above-described case can be performed, and substantially the same advantageous effects can be achieved. In addition, the contacting of the contact point P2 and the contact point P4 may be conducted substantially at the same time as the contacting of the contact point P1 and the contact point P3. In this configuration as well, qualitatively the same controlling as in the above-described case can be performed, and substantially the same advantageous effects can be achieved.

Although the foregoing embodiments 1 to 6 have described the cases in which the functional element is an LED, the functional element may be other types of light emitting elements. In addition, the functional element is not limited to the light emitting elements but may be various other electric elements that exhibit functions other than limit emission.

Although the foregoing embodiments 1 to 6 describe the cases in which the element breakdown prevention circuit is disposed on the secondary side of the functional element (the cathode side of the LED), it is also possible that the element breakdown prevention circuit may be disposed on the primary side of the functional element (the anode side of the LED).

Although an element breakdown prevention circuit has been described above, the present invention may also include various electric devices in which the element breakdown prevention circuit is incorporated. Specific examples include an adapter having the element breakdown prevention circuit and being connected between a common constant-current power supply and a common electric device so as to allow a functional element contained in the electric device to be demountable, a power supply device in which the element breakdown prevention circuit and a constant-current power supply are integrated, an electric device in which the element breakdown prevention circuit and a functional element are integrated, and an electric device in which the element breakdown prevention circuit, a constant-current power supply, and a functional element are integrated. When the functional element is a high-current type functional element that is operated at high current, the advantageous effects of the present invention are more significant. For this reason, it is preferable that the electric apparatus be an LED illuminating device, an LED light, an LED signboard, and an LED indicator light, that are provided with high current LEDs.

INDUSTRIAL APPLICABILITY

The present invention is applicable to an adapter for connecting a constant-current power supply and an electric apparatus having a functional element to each other, a constant-current power supply device, and an electric apparatus having a functional element such as a light emitting element, such as lighting devices for illuminating a wide area or a narrow area (illumination lamps and lights), and light-emitting devices for display devices for displaying characters, graphics, patterns, images, and videos (signboards, indicator lights, and image display devices).

BRIEF DESCRIPTION OF THE DRAWINGS

FIG. 4 is a timing chart qualitatively illustrating one example of the operation of the element breakdown prevention circuit according to Embodiment 2.

FIG. 9 is a timing chart qualitatively illustrating one example of the operation of the element breakdown prevention circuit according to Embodiment 5.

FIG. 11 is a timing chart qualitatively illustrating one example of the operation of the element breakdown prevention circuit according to Embodiment 6.

FIG. 12 is a set of circuit diagrams, wherein FIG. 12(A) illustrates the electrical configuration of a typical conventional LED apparatus using a constant-voltage power supply, and FIG. 12(B) illustrates the electrical configuration of a typical conventional LED apparatus using a constant-current power supply.

DESCRIPTION OF REFERENCE NUMERALS

Figure 1:
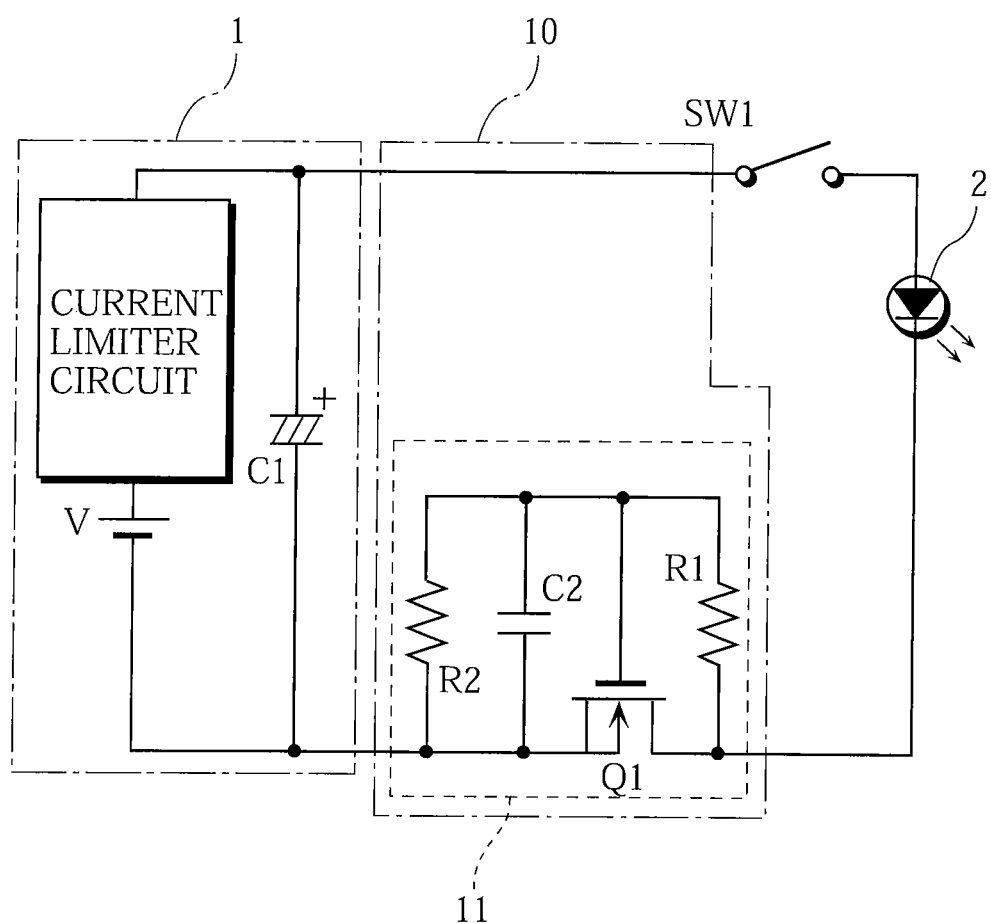
FIG. 1 is a circuit diagram illustrating one example of an element breakdown prevention circuit according to Embodiment 1.
Figure 2:
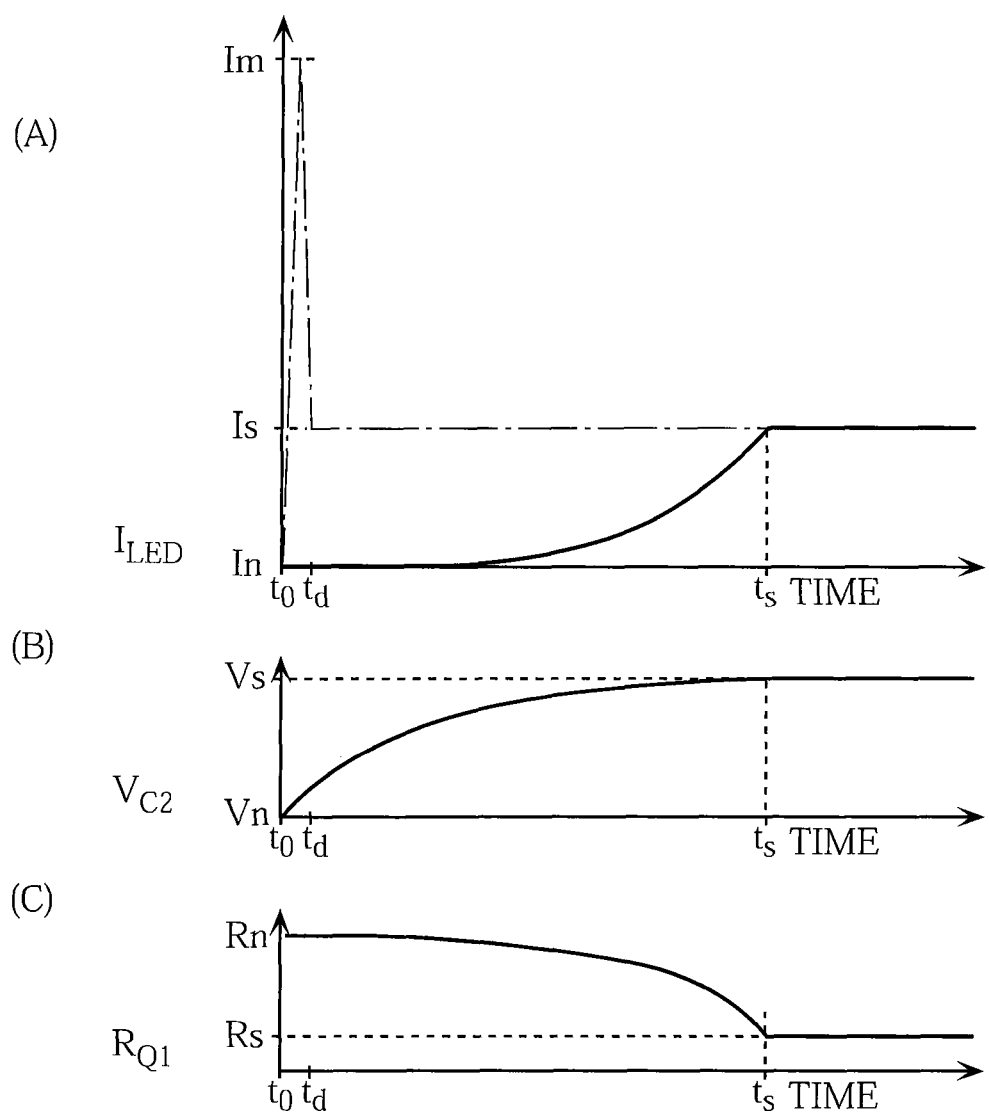
FIG. 2 is a timing chart qualitatively illustrating one example of the operation of the element breakdown prevention circuit according to Embodiment 1.
Figure 3:
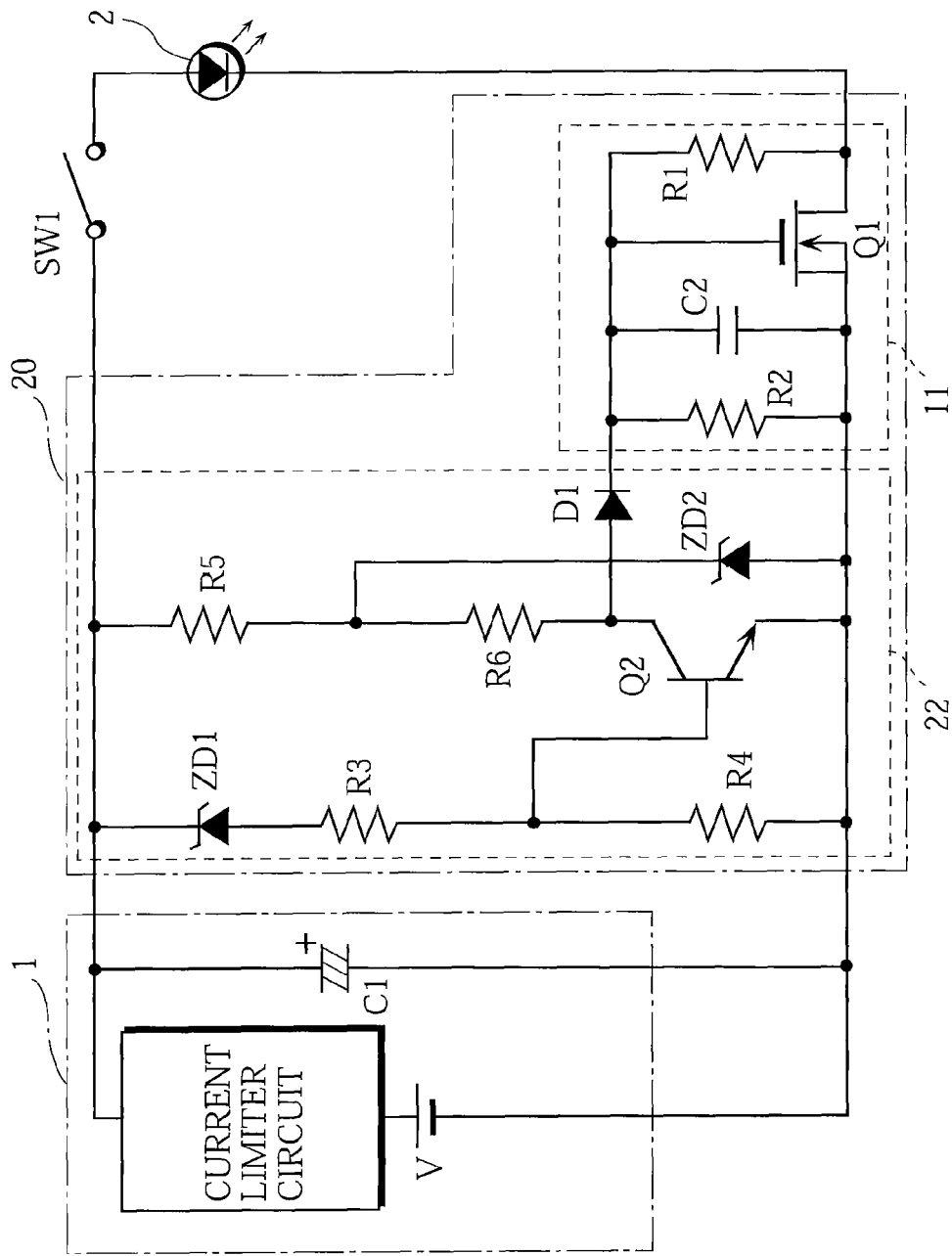
FIG. 3 is a circuit diagram illustrating one example of an element breakdown prevention circuit according to Embodiment 2.
Figure 5:
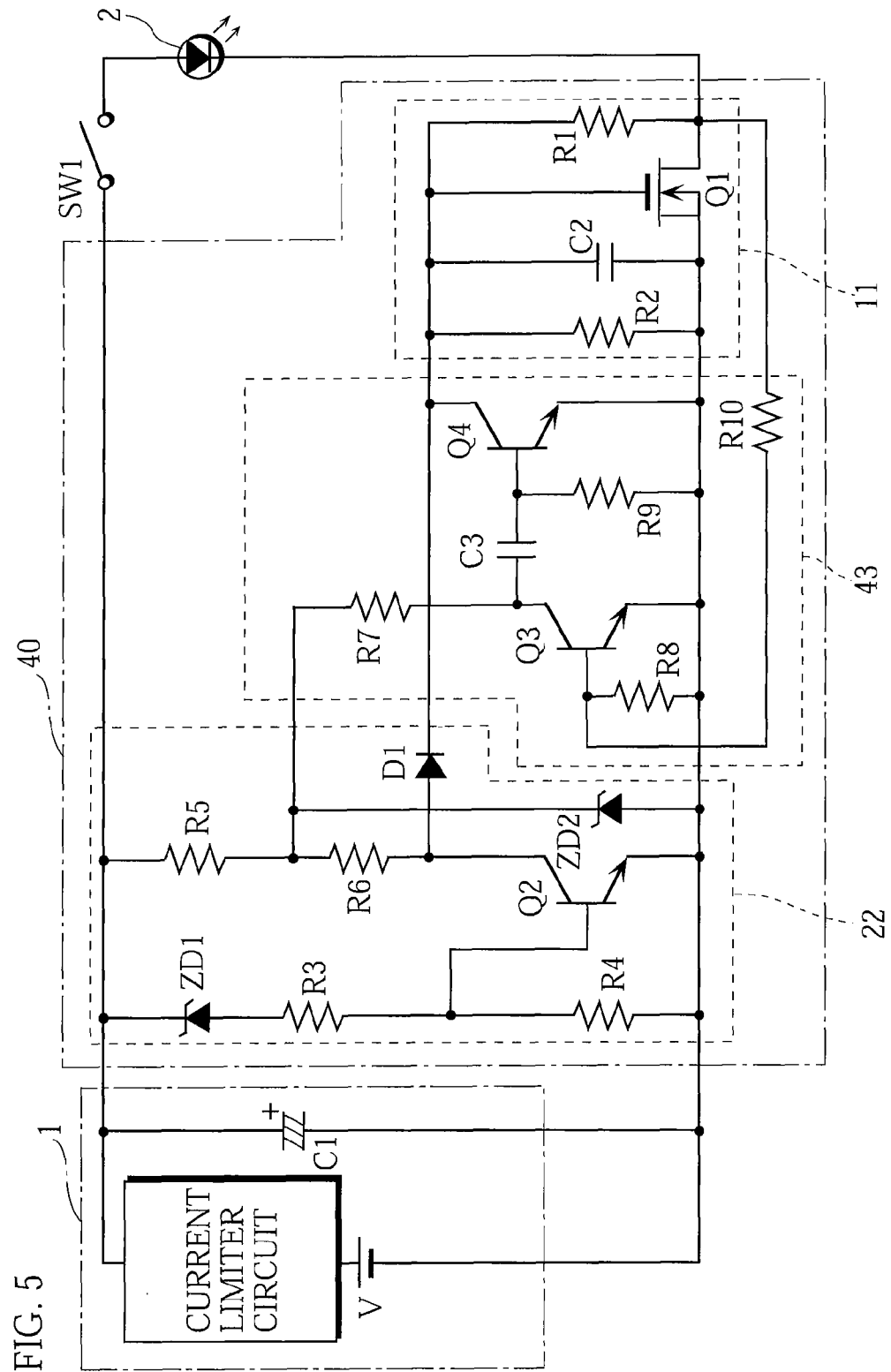
FIG. 5 is a circuit diagram illustrating one example of an element breakdown prevention circuit according to Embodiment 3.
Figure 6:
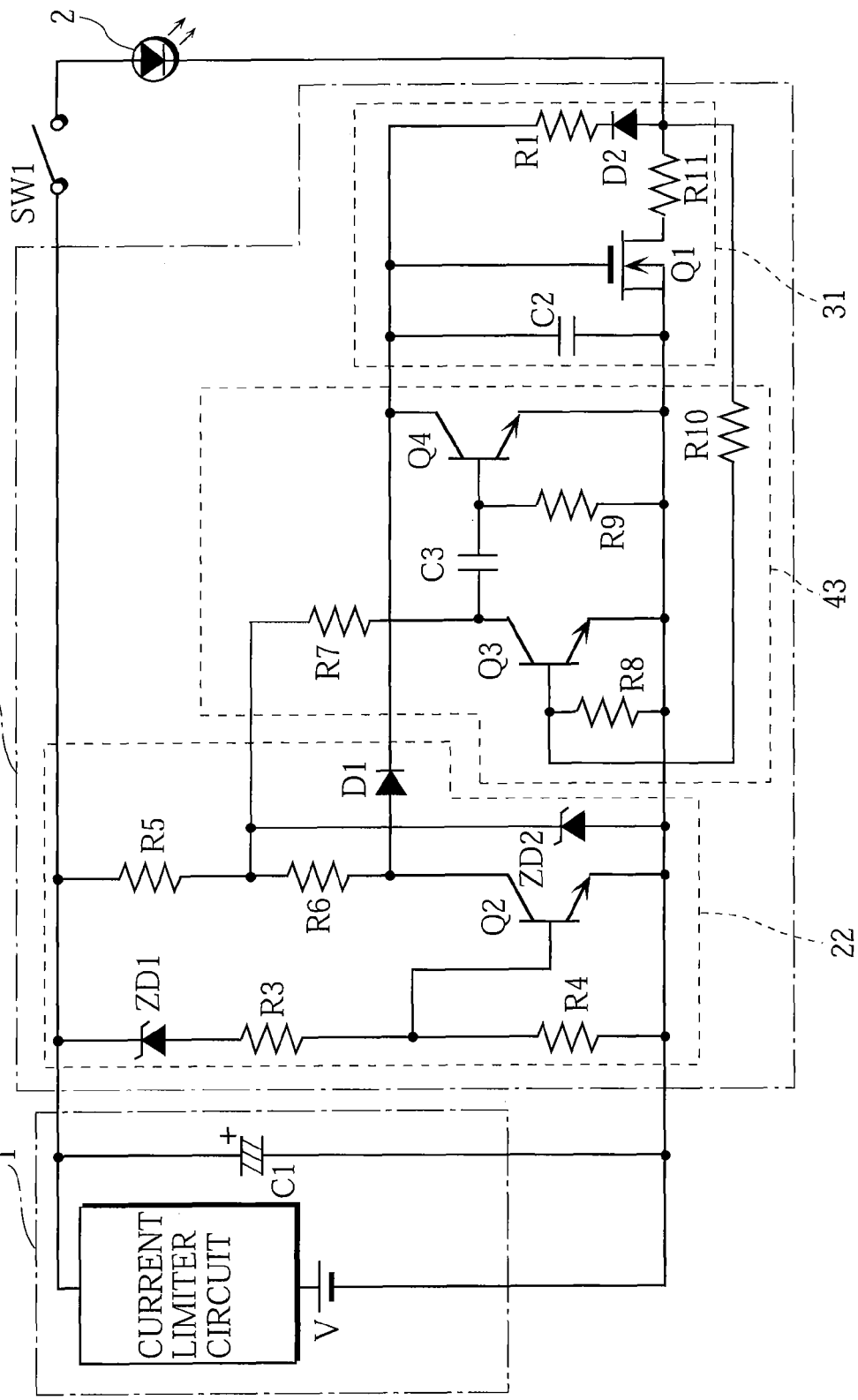
FIG. 6 is a circuit diagram illustrating a modified example of the element breakdown prevention circuit according to Embodiment 3.
Figure 7:
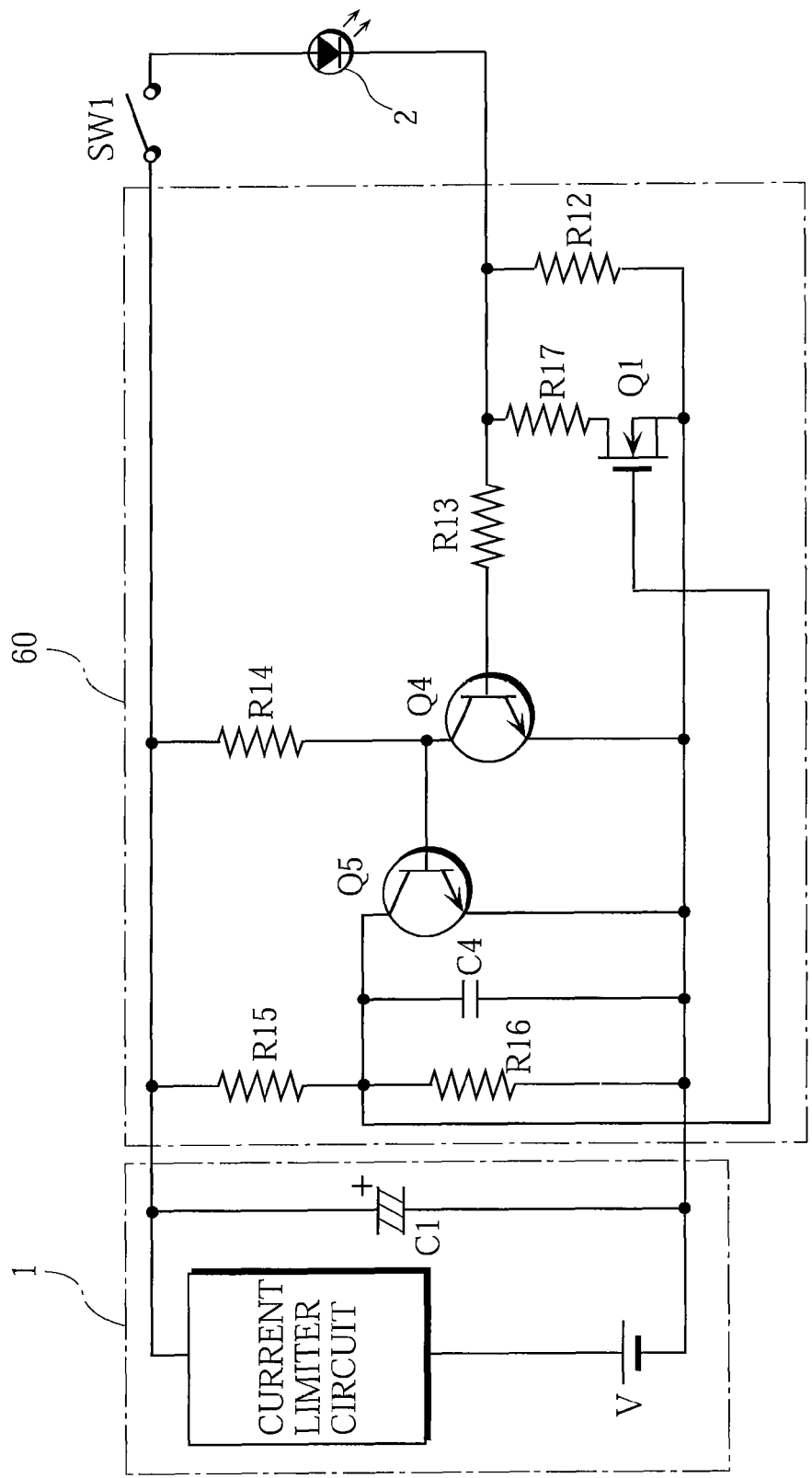
FIG. 7 is a circuit diagram illustrating one example of an element breakdown prevention circuit according to Embodiment 4.
Figure 8:
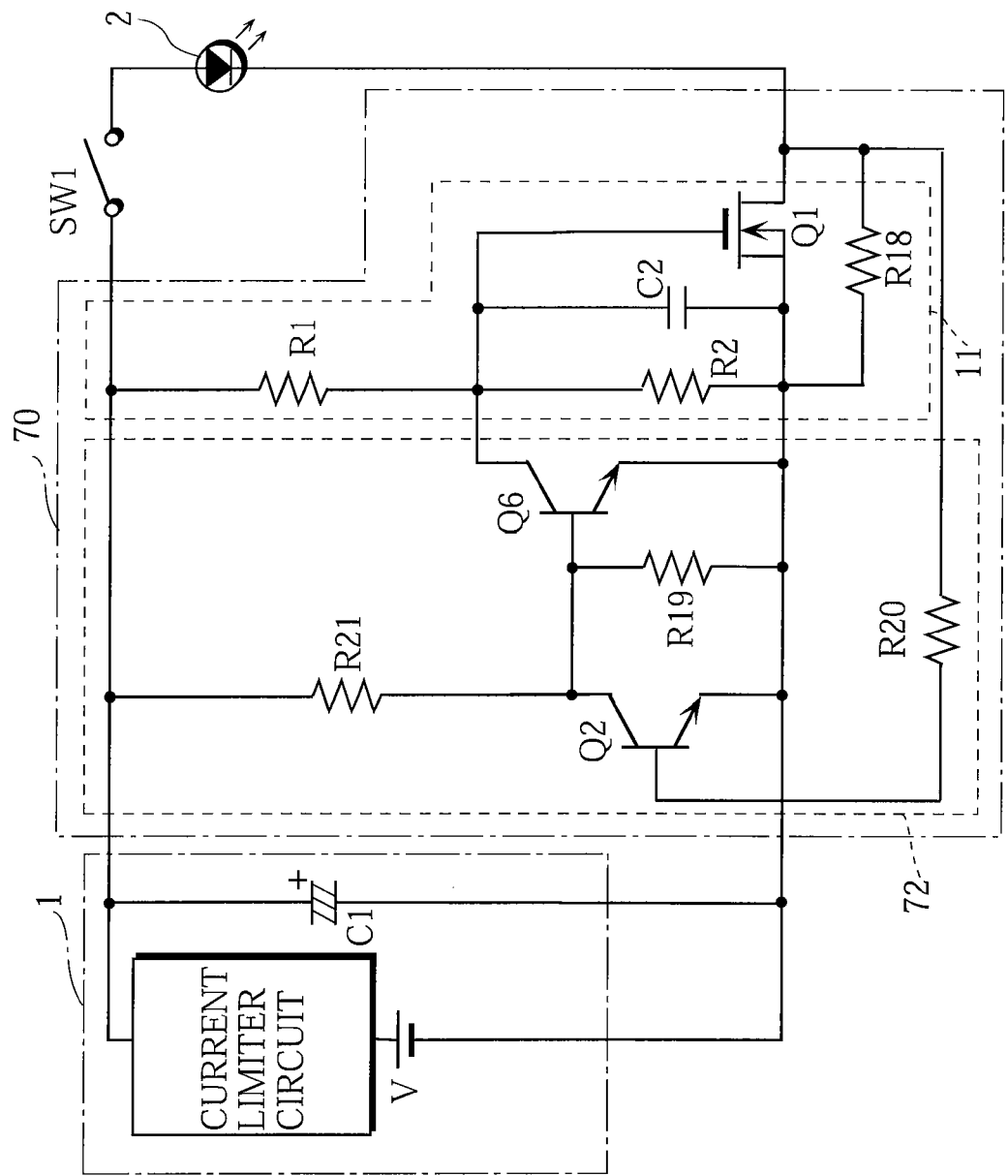
FIG. 8 is a circuit diagram illustrating one example of an element breakdown prevention circuit according to Embodiment 5.
Figure 10:
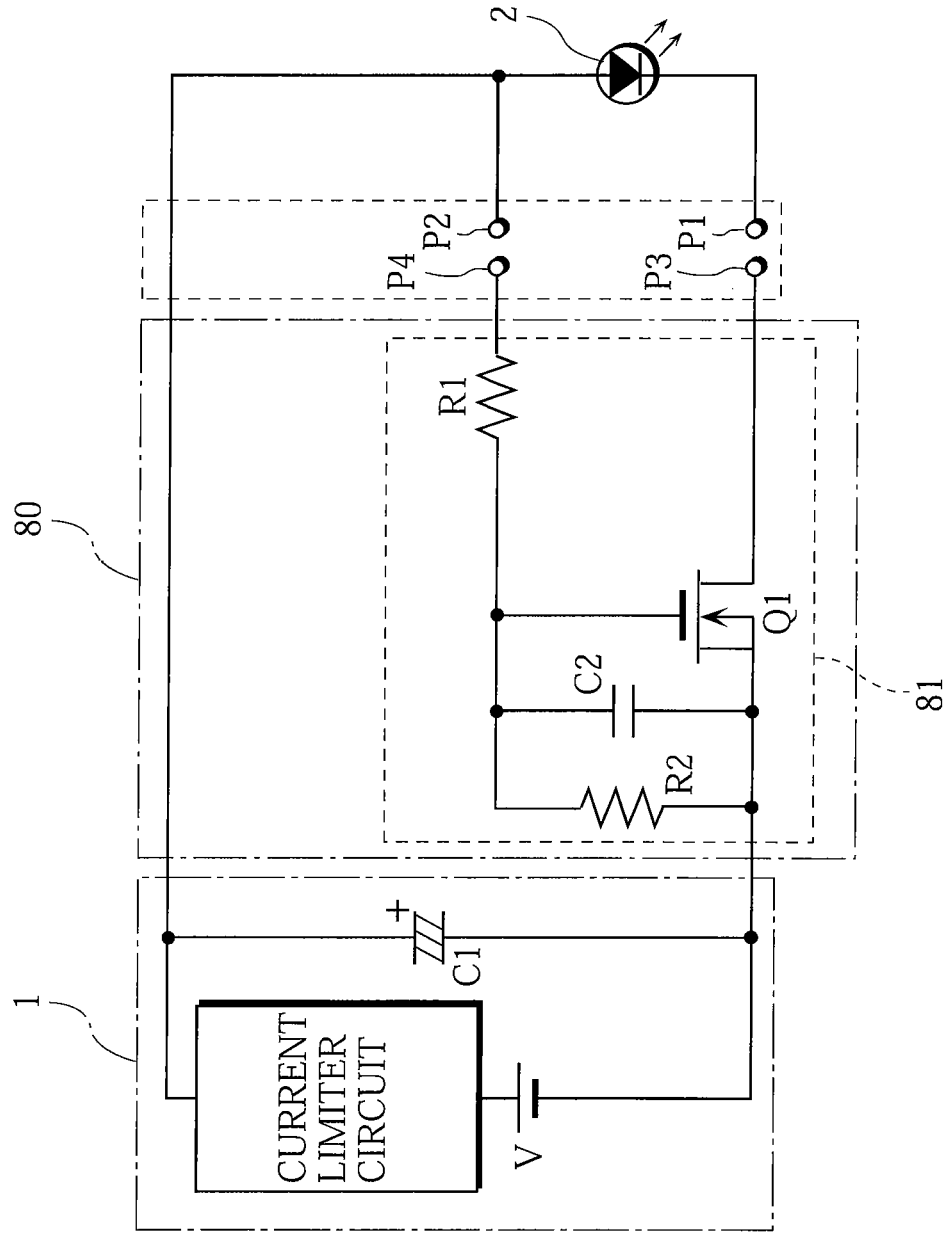
FIG. 10 is a circuit diagram illustrating one example of an element breakdown prevention circuit according to Embodiment 6.

1: constant-current power supply
2: LED (functional element)
10, 20, 40, 50, 60, 70, 80: element breakdown prevention circuit
11, 31, 71, 81: transient current restraining circuit
22: resistance eliminating circuit (impedance decrease accelerating circuit)
43, 73: resistance increase accelerating circuit (impedance increase accelerating circuit)
Q1: field-effect transistor (switching element)

The invention claimed is:

1. An electric circuit for electrically connecting a constant-current power supply and a detachable functional element to each other, the constant-current power supply having a capacitance between an output terminal and a reference potential terminal, and the detachable functional element being configured to exhibit a predetermined function based on electric power from the constant-current power supply, comprising:

an element breakdown prevention circuit having a first circuit terminal connected to the output terminal of the constant-current power supply via the functional element and a second circuit terminal connected to the reference potential terminal of the constant-current power supply, the electric circuit being characterized in that:

the electric circuit has a disconnected state in which the first circuit terminal and the output terminal of the constant-current power supply are electrically disconnected by demounting of the functional element and a connected state in which the first circuit terminal and the output terminal are electrically connected to each other by mounting of the functional element;

the element breakdown prevention circuit increases an impedance between the first circuit terminal and the second circuit terminal self-adjustingly to a disconnected state impedance in response to a state transition from the connected state to the disconnected state; and the element breakdown prevention circuit decreases the impedance between the first circuit terminal and the second circuit terminal self-adjustingly to a connected-state impedance that is lower than the disconnected-state impedance in response to a state transition from the disconnected state to the connected state.

2. The electric circuit according to claim 1, wherein:

the element breakdown prevention circuit comprises:

a switching element having a current entering terminal connectable to the functional element, a current exiting terminal connectable to the reference potential terminal of the constant-current power supply, and a control terminal for changing a resistance between the current entering terminal and the current exiting terminal; and a voltage-dependent type switching-control circuit for controlling the voltage of the control terminal based on a voltage change of the current entering terminal of the switching element; and wherein the switching-control circuit is configured to:

change a resistance between the current entering terminal and the current exiting terminal from a predetermined connected-state resistance value in the connected state to a predetermined disconnected-state resistance value that is greater than the connected-state resistance value, based on a voltage change of the current entering terminal of the switching element in response to the state transition to the disconnected state; and change the resistance between the current entering terminal and the current exiting terminal from the disconnected-state resistance value to the connected-state resistance value, based on a voltage change of the current entering terminal of the switching element in response to the state transition to the connected state.

3. The electric circuit according to claim 1, wherein:

the element breakdown prevention circuit comprises:

a switching element having a current entering terminal connectable to the functional element, a current exiting terminal connectable to the reference potential terminal of the constant-current power supply, and a control terminal for controlling a resistance value between the current entering terminal and the current exiting terminal; and a current-dependent type switching-control circuit for controlling the voltage of the control terminal based on a change of the current entering the current entering terminal of the switching element, the switching-control circuit being configured to:

change a resistance between the current entering terminal and the current exiting terminal from a predetermined connected-state resistance value in the connected state to a predetermined disconnected-state resistance value that is greater than the connected-state resistance value, based on a change of the current entering the first circuit terminal in response to the state transition to the disconnected state; and change the resistance between the current entering terminal and the current exiting terminal from the disconnected-state resistance value to the connected-state resistance value, based on a change of the current entering the first circuit terminal in response to the state transition to the connected state.

4. The electric circuit according to claim 2, wherein the element breakdown prevention circuit further comprises an impedance decrease accelerating circuit for changing an impedance between the first circuit terminal and the second circuit terminal to an impedance lower than the connected-state impedance in response to the state transition to the connected state.

5. The electric circuit according to claim 2, wherein the element breakdown prevention circuit further comprises an impedance increase accelerating circuit for accelerating a change of the impedance between the first circuit terminal and the second circuit terminal that accompanies the state transition to the disconnected state.

6. The electric circuit according to claim 3, wherein the element breakdown prevention circuit further comprises an impedance increase accelerating circuit for accelerating a change of the impedance between the first circuit terminal and the second circuit terminal that accompanies the state transition to the disconnected state.

7. The electric circuit according to claim 4, wherein the element breakdown prevention circuit further comprises an impedance increase accelerating circuit for accelerating a change of the impedance between the first circuit terminal and the second circuit terminal that accompanies the state transition to the disconnected state.

8. The electric circuit according to claim 1, wherein:
the element breakdown prevention circuit further comprises:
a switching element having a current entering terminal connectable to the functional element, a current exiting terminal connectable to the reference potential terminal of the constant-current power supply, and a control terminal for changing a resistance between the current entering terminal and the current exiting terminal; and
an additional circuit terminal connectable to the output terminal of the constant-current power supply in a process of mounting the functional element, and wherein
the element breakdown prevention circuit changes a resistance between the current entering terminal and the current exiting terminal from a predetermined connected-state resistance value in the connected state to a predetermined disconnected-state resistance value that is greater than the connected-state resistance value, based on a voltage change of the additional circuit terminal in response to the state transition to the disconnected state; and
the element breakdown prevention circuit changes the resistance between the current entering terminal and the current exiting terminal from the disconnected-state resistance value to the connected-state resistance value, based on a voltage change of the additional circuit terminal in response to the state transition to the connected state.

9. An electric circuit for electrically connecting a constant-current power supply and a detachable functional element to each other, the constant-current power supply having a capacitance between an output terminal and a reference potential terminal, and the detachable functional element being configured to exhibit a predetermined function based on electric power from the constant-current power supply, comprising:
an element breakdown prevention circuit provided between the constant-current power supply and the functional element, and wherein:
a state in which the functional element is demounted is defined as a disconnected state, and a state in which the functional element is mounted is defined as a connected state;
an impedance between a first circuit terminal and a second circuit terminal of the element breakdown prevention circuit is increased self-adjustingly to a disconnected state impedance in response to a state transition from the connected state to the disconnected state; and
an impedance between the first circuit terminal and the second circuit terminal is decreased self-adjustingly to a connected-state impedance that is lower than the disconnected-state impedance in response to a state transition from the disconnected state to the connected state.

* * * * *